(12) United States Patent
Shabat et al.

(10) Patent No.: US 11,704,584 B2
(45) Date of Patent: Jul. 18, 2023

(54) FAST AND ACCURATE MACHINE LEARNING BY APPLYING EFFICIENT PRECONDITIONER TO KERNEL RIDGE REGRESSION

(71) Applicant: Playtika Ltd., Hertsliya (IL)

(72) Inventors: Gil Shabat, Hod Hasharon (IL); Era Choshen, Pardes Hanna (IL); Dvir Ben-Or, Kfar Saba (IL); Nadav Carmel, Ramat Gan (IL)

(73) Assignee: Playtika Ltd., Hertsliya (IL)

( * ) Notice: Subject to any disclaimer, the term of this patent is extended or adjusted under 35 U.S.C. 154(b) by 502 days.

(21) Appl. No.: 16/881,278

(22) Filed: May 22, 2020

(65) Prior Publication Data
US 2021/0365820 A1    Nov. 25, 2021

(51) Int. Cl.
  *G06N 20/00*    (2019.01)
  *G06N 20/10*    (2019.01)
  *G06N 7/00*     (2023.01)
  *G06N 5/022*    (2023.01)

(52) U.S. Cl.
  CPC ............ *G06N 7/005* (2013.01); *G06N 5/022* (2013.01); *G06N 20/00* (2019.01)

(58) Field of Classification Search
  CPC ........ G06N 7/005; G06N 20/00; G06N 5/022; G06N 20/10
  USPC ........................................................ 706/12
  See application file for complete search history.

(56) References Cited

U.S. PATENT DOCUMENTS

| | | | | |
|---|---|---|---|---|
| 9,658,987 | B2* | 5/2017 | Avron ................... | G06N 20/10 |
| 2006/0271532 | A1* | 11/2006 | Selvaraj ............... | G06F 16/951 |
| | | | | 707/999.005 |
| 2009/0150126 | A1* | 6/2009 | Sellamanickam ..... | G06N 7/005 |
| | | | | 703/2 |
| 2014/0153843 | A1* | 6/2014 | Aghagolzadeh ........ | G06T 3/403 |
| | | | | 382/299 |

(Continued)

OTHER PUBLICATIONS

Matin Strazar et al., Learning the kernel matrix by predictive low-rank approximations, published May 9, 2016 via arXiv, pp. 1-25 (pdf).*

(Continued)

*Primary Examiner* — Manglesh M Patel
(74) *Attorney, Agent, or Firm* — Pearl Cohen Zedek Latzer Baratz LLP

(57) ABSTRACT

Accelerated machine learning using an efficient preconditioner for Kernel Ridge Regression (KRR). A plurality of anchor points may be selected by: projecting an initial kernel onto a random matrix in a lower dimensional space to generate a randomized decomposition of the initial kernel, permuting the randomized decomposition to reorder its columns and/or rows to approximate the initial kernel, and selecting anchor points representing a subset of the columns and/or rows based on their permuted order. A reduced-rank approximation kernel may be generated comprising the subset of columns and/or rows represented by the selected anchor points. A KRR system may be preconditioned using a preconditioner generated based on the reduced-rank approximation kernel. The preconditioned KRR system may be solved to train the machine learning model. This KRR technique may be executed without generating the KRR kernel, reducing processor and memory consumption.

20 Claims, 8 Drawing Sheets

(56) References Cited

U.S. PATENT DOCUMENTS

2020/0019839 A1* 1/2020 Boahen .................. G06F 17/16

OTHER PUBLICATIONS

Jonathan A. Kelner et al., On the Power of Preconditioning in Sparse Linear Regression, published Jun. 17, 2021 via arXiv, pp. 1-73 (pdf).*
Gil Shabat et al., Fast and Accurate Gaussian Kernel Ridge Regression Using Matrix Decompositions for Preconditioning, published Apr. 6, 2021 via arXiv, pp. 1-28 (pdf).*
Avron, Haim, et al. "High-Performance Kernel Machines with Implicit Distributed Optimization and Randomization." Technometrics, 58(3):341-349, 2016.
Bermanis, Amit et al. "Multiscale Data Sampling and Function Extension." Applied and Computational Harmonic Analysis, 34(1):15-29, 2013.
Bermanis, Amit et al. "Cover-Based Bounds on the Numerical Rank of Gaussian Kernels." Applied and Computational Harmonic Analysis, 36(2):302-315, 2014.
Bernstein, Dennis S. "Matrix Mathematics: Theory, Facts, and Formulas." Princeton University Press, 1104 pages, 2009.
Bronstein, Alexander M. et al. "Numerical Geometry of Non-Rigid Shapes." Springer Science & Business Media, Chapters 3 and 4 excerpts, 2008.
Chandrasekaran, S. et al. On Rank-Revealing QR Factorisations, 33 pages, 1991.
Clarkson, Kenneth L. et al. "Low-Rank Approximation and Regression in Input Sparsity Time." Journal of the ACM (JACM), 63(6):54, 2017.
Cutajar, Kurt et al. "Preconditioning Kernel Matrices." International Conference on Machine Learning, pp. 2529-2538, 2016.
Dai, Bo et al. "Scalable Kernel Methods via Doubly Stochastic Gradients." Advances in Neural Information Processing Systems, pp. 3041-3049, 2014.
Drineas, Petros et al. "Relative-Error CUR matrix decompositions." SIAM Journal on Matrix Analysis and Applications, 30(2):844-881, 2008.
Freitas, Nando D. et al. "Fast Krylov Methods for N-Body Learning." Advances in Neural Information Processing Systems, pp. 251-258, 2006.
Gardner, Jacob et al. "Gpytorch: Blackbox Matrix-Matrix Gaussian Process Inference with GPU Acceleration." Advances in Neural Information Processing Systems, pp. 7576-7586, 2018.
Goreinov, Sergei A. et al. "A Theory of Pseudoskeleton Approximations." Linear Algebra and Its Applications, 261(1-3):1-21, 1997.
Greengard, Leslie et al. "A Fast Algorithm for Particle Simulations." Journal of Computational Physics, 73(2):325-348, 1987.
Greengard, Leslie et al. "The Fast Gauss Transform." SIAM Journal on Scientific and Statistical Computing, 12(1):79-94, 1991.
Gu, Ming et ai. "Efficient Algorithms for Computing a Strong Rank-Revealing QR Factorization." SIAM Journal on Scientific Computing, 17(4):848-869, 1996.
Martinsson, Per-Gunnar et al. "On the Compression of Low Rank Matrices." SIAM, 26(4):1389-1404, 2005.
Avron, Haim et al. "Faster Kernel Ridge Regression Using Sketching and Preconditioning." SIAM, 38:1116-1138, 2017.
Halko, Nathan et ai. "Finding Structure with Randomness: Probabilistic Algorithms for Constructing Approximate Matrix Decompositions." SIAM Review, 53(2):217-288, 2011.
Hong, Y.P et al. "Rank-Revealing QR Factorizations and the Singular Value Decomposition." Mathematics of Computation, pp. 213-232, 1992.
Lu, Zhiyun et al. "How to Scale Up Kernel Methods to be as Good as Deep Neural Nets." arXiv preprint, arXiv:1411.4000, 2014.
Mahoney, Michael W. et al. "CUR Matrix Decompositions for Improved Data Analysis." Proceedings of the National Academy of Sciences, 106(3):697-702, 2009.
Mahoney, Michael W. et al. "Randomized algorithms for matrices and data." Foundations and Trends in Machine Learning, 3(2):123-224, 2011.
Martinsson, Per-Gunnar et al. "A Randomized Algorithm for the Decomposition of Matrices." Applied and Computational Harmonic Analysis, 30(1):47-68, 2011.
Miranian, L. et al. "Strong Rank Revealing LU Factorizations." Linear Algebra and its Applications, 367:1-16, 2003.
Morariu, Vlad I. et al. "Automatic Online Tuning for Fast Gaussian Summation." Advances in Neural Information Processing Systems, pp. 1113-1120, 2009.
Musco, Cameron et al. "Recursive Sampling for the Nystrom Method." In Advances in Neural Information Processing Systems, pp. 3833-3845, 2017.
Osinsky, Al et al. "Pseudo-Skeleton Approximations with Better Accuracy Estimates." Linear Algebra and its Applications, 537:221-249, 2018.
Pan, C-T "On the Existence and Computation of Rank-Revealing LU Factorizations." Linear Algebra and its Applications, 316(1-3):199-222, 2000.
Abbeel, Pieter et al. "Autonomous Helicopter Aerobatics Through Apprenticeship Learning." IJRR, 2010.
Rahimi, Ali et al. "Random Features for Large-Scale Kernel Machines." Advances in Neural Information Processing Systems, pp. 1177-1184, 2008.
Raykar, Vikas C. et al. "Fast Large Scale Gaussian Process Regression Using Approximate Matrix-Vector Products." In Learning Workshop, 2 pages, 2007.
Rudi, Alessandro et al. "FALKON: An Optimal Large Scale Kernel Method." In Advances in Neural Information Processing Systems, pp. 3888-3898, 2017.
Shabat, Gil et al. "Randomized LU Decomposition." Applied and Computational Harmonic Analysis, 44(2):246-272, 2018.
Shen, Yirong et al. "Fast Gaussian Process Regression Using KD-Trees." Advances in Neural Information Processing Systems, pp. 1225-1232, 2006.
Srinivasan, Balaji V. et al. "Preconditioned Krylov Solvers for Kernel Regression." arXiv preprint, arXiv:1408.1237, 2014.
Voronin, Sergey et al. "Efficient Algorithms for CUR and Interpolative Matrix Decompositions." Advances in Computational Mathematics, 43(3):495-516, 2017.
Wang, Ke Alexander et al. "Exact Gaussian Processes on a Million Data Points." arXiv preprint, arXiv:1903.08114, 2019.
Yang, Changjiang, et al. "Improved Fast Gauss Transform and Efficient Kernel Density Estimation." Proceedings of the Ninth IEEE International Conference on Computer Vision, 8 pages, 2003.
Yang, Changjiang et al. "Efficient Kernel Machines Using the Improved Fast Gauss Transform." Advances in Neural Information Processing Systems, pp. 1561-1568, 2005.

* cited by examiner ents of the invention use Kernel Ridge Regression (KRR) to accelerate machine learning.

FAST AND ACCURATE MACHINE LEARNING BY APPLYING EFFICIENT PRECONDITIONER TO KERNEL RIDGE REGRESSION

FIELD OF THE INVENTION

Embodiments of the invention are directed to machine learning and artificial intelligence. In particular, embodiments of the invention use Kernel Ridge Regression (KRR) to accelerate machine learning.

BACKGROUND OF THE INVENTION

Machine learning trains computer models to learn tasks, such as, autonomous vehicle driving, weather forecasting, and natural language recognition. In machine learning, training datasets of target behavior may train a model according to its outcomes. Once trained, the machine learning model may process new inputs to infer or predict new outcomes according to that learned behavior.

Conventional machine learning systems were developed that use Kernel Ridge Regression (KRR) to train a model. KRR combines ridge regression model fitting (e.g., linear least squares with L2-norm regularization) with a "kernel trick." The kernel trick allows relatively simple computations performed directly on the kernel (e.g., k(x,y) in O(d) time for d input features) to replace relatively expensive computations performed in a feature space (e.g., $\phi(x)\cdot\phi(y)$ in $O(d^p)$ time, where p is the polynomial degree of the computation).

However, even with the kernel trick, conventional Kernel Ridge Regression (KRR) is still extremely complex and time-consuming. This is due to several high-cost computations in the Kernel Ridge Regression (KRR) algorithm, such as, building and inverting a kernel matrix. For example, for an input training dataset of size n×d (n input training data points and d features per point), a kernel matrix is built in $O(n^2 d)$ operations, the kernel matrix is inverted in $O(n^3)$ operations, and the kernel matrix is stored in $O(n^2)$ spaces in memory. As the number of input data points n in the training dataset increases, these numbers of operations and amounts of memory usage grow exponentially, resulting in prohibitively slow runtimes and prohibitively cumbersome memory consumption.

Accordingly there is a longstanding need in the art to reduce both the computational cost and memory consumption of running a Kernel Ridge Regression (KRR) machine learning algorithm.

SUMMARY OF EMBODIMENTS OF THE INVENTION

Embodiments of the invention solve the aforementioned longstanding need in the art by providing a Kernel Ridge Regression (KRR) algorithm that uses a preconditioner to accelerate the solution. The kernel in KRR is often poorly conditioned, which means the KRR algorithm requires a relatively large number of iterations to converge. Embodiments of the invention use a preconditioner P that converts an initial KRR system with relatively poor conditioning (e.g., relatively high condition number) to a conditioned KRR system with relatively good conditioning (e.g., relatively low condition number). Because the resulting conditioned KRR system is well-conditioned, the KRR algorithm uses a relatively lower number of iterations to converge. Embodiments of the invention may be executed using various matrix decompositions including a randomized interpolative decomposition (RID) of the kernel to build the preconditioner P and a CUR decomposition or Nyström approximation to apply the preconditioner P to the KRR system. Embodiments of the invention may be combined with a fast matrix multiplication method, which allows application of the kernel (e.g., in its reduced-rank form) without building the kernel itself. The result of preconditioning the KRR system is an accelerated KRR algorithm that can process large datasets with computational complexity of linear order of the number n of data points in the training dataset, O(n). The preconditioner P thus substantially reduces the condition number of the preconditioned system of KRR equations (e.g., $P(K+\beta I)\alpha$) to reduce the total number of iterations for the KRR solution (e.g., $\alpha$) to converge.

Additionally or alternatively, embodiments of the invention provide an upper bound to the condition number of the preconditioned system of KRR equations, and thus the number of iterations used to converge, sufficient to meet a desired level of accuracy.

Additionally or alternatively, embodiments of the invention may determine, for Gaussian kernels, a lower bound for the rank k, which defines the number of anchor points to be selected, in order to achieve a desired condition number. This lower bound may be determined directly from the training dataset itself, without performing any analysis on the kernel. According to such embodiments, the user can determine the trade-off between the rank (and the corresponding number of anchor points) and the condition number directly from the training data. For example, a relatively smaller rank typically has a relatively lower computational cost in each iteration, but typically yields a relatively larger condition number associated with a relatively higher number of iterations to converge. Determining this trade-off directly from the training data, without building the kernel, saves significant amounts of computational and memory resources.

Embodiments of the invention may be implemented in various applications including autonomous driving, image recognition, computer vision, virtual or augmented reality, speech recognition, text understanding, or other applications. An example is provided to train a KRR machine learning model for autonomous driving, in particular, using a training dataset for autonomous helicopter aerobatics. Results of the KRR model's convergence are shown by the solid lines in FIGS. 3A-3F. Another example is provided to train a KRR machine learning model for simulating an electromagnetic field. Results of the KRR model's convergence are shown by the solid lines in FIGS. 4A-4D.

In an embodiment of the invention, a device, system and method is provided for training a machine learning model using Kernel Ridge Regression (KRR). A plurality of anchor points may be selected that represents a subset of columns and/or rows of an initial kernel K of a training dataset, without generating the initial kernel K. The anchor point selection may include generating a randomized decomposition of the initial kernel K by projecting the initial kernel K onto a random matrix in a lower dimensional space, permuting the randomized decomposition to reorder the columns and/or rows to approximate the initial kernel K, and selecting anchor points representing a subset of columns and/or rows based on their permuted order. A reduced-rank kernel $\tilde{K}$ may be generated comprising the subset of columns and/or rows represented by the selected anchor points, wherein the reduced-rank kernel $\tilde{K}$ approximates the initial kernel K with a relatively lower rank than the initial kernel K. A KRR system may be preconditioned using a preconditioner generated based on the reduced-rank kernel $\tilde{K}$. The preconditioned KRR system may be solved to train the machine learning model. This KRR technique may be executed without generating the KRR kernel, reducing processor and memory consumption. Once trained, the machine learning model may be executed in a prediction mode, for example, for autonomous driving, electromagnetic field simulation, or other artificial intelligence applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A-4D compare results for (a) a conventional KRR algorithm with no preconditioner (dashed curves) and (b) a KRR algorithm with a preconditioner generated using randomized decomposition in accordance with some embodiments of the invention (solid curves).

Figure 1:
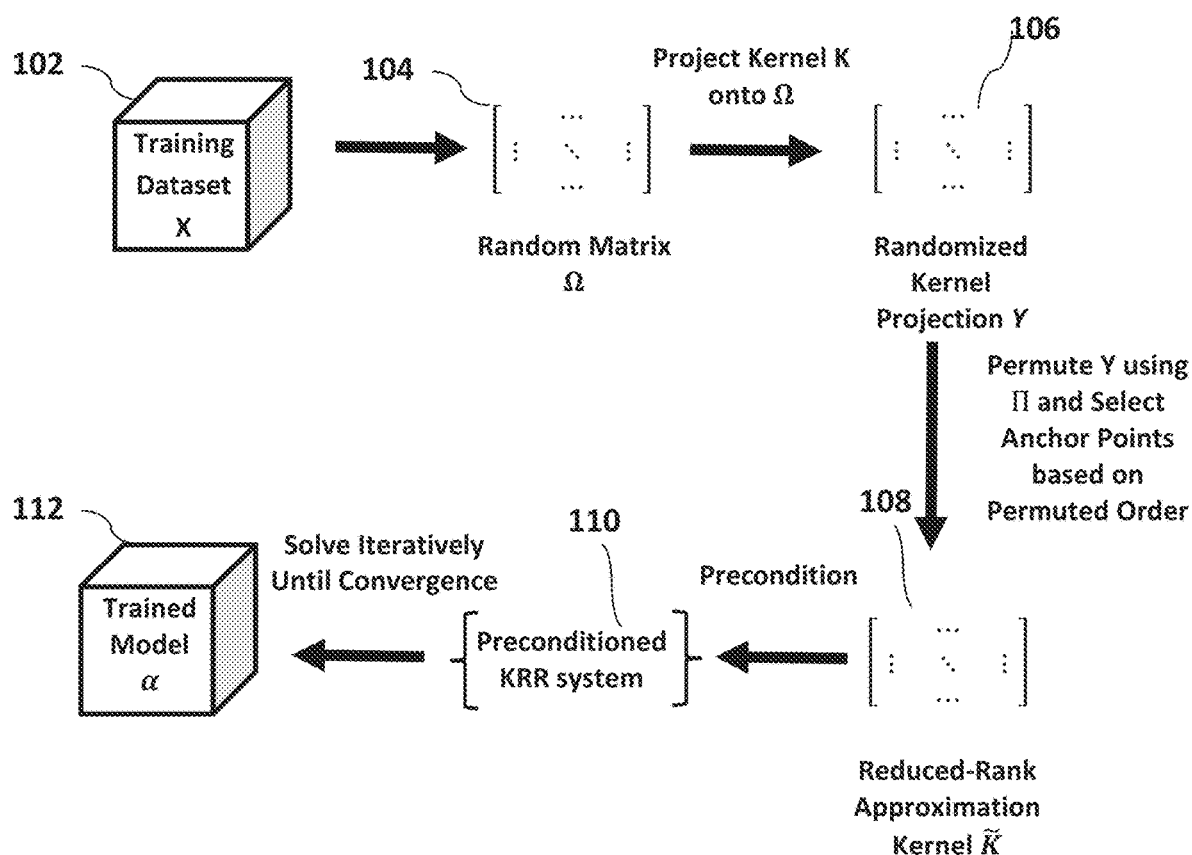
FIG. 1 schematically illustrates data structures for fast and accurate machine learning by applying an efficient preconditioner to kernel ridge regression in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS
OF THE INVENTION

Machine learning algorithms may be implemented to train various models, such as, an autonomous driving model (see e.g., results in FIGS. 3A-3F), an electromagnetic field simulation model (see e.g., results in FIGS. 4A-4D), or any other artificial intelligence model.

Machine learning algorithms use kernel techniques to embed an input space into a higher dimensional feature space, which enables learning over a richer and more complex hypothesis class. One such kernel method is Kernel Ridge Regression (KRR).

Kernel Ridge Regression (KRR) inputs a training dataset comprising n data points, e.g., $(x_i, y_i) \in X \times Y$, where $X \subseteq \mathbb{R}^d$ is the input domain and $Y \subseteq \mathbb{R}$ is the output domain. In a prediction phase, the machine learning KRR model is designed to input a value x and predict or infer a corresponding output f(x), e.g., defined by:

$$f(x) = \sum_{j=1}^{n} k(x_j, x)\alpha_j \quad (1)$$

where k is the kernel from $$X \times X \to \mathbb{R}$$

and $\alpha = (\alpha_1 \ldots \alpha_n)^T$ is the trained model, e.g., represented as a vector of weights in the space induced by the kernel. In a training phase, the weights $\alpha$ are determined as the solution to the KRR model, e.g., by solving:

$$(K+\beta I)\alpha = b \quad (2)$$

where $K \in \mathbb{R}^{n \times n}$ is the kernel matrix, $K_{ij} = k(x_i, x_j)$.

KRR is a powerful technique that typically achieves empirically good results. However, KRR comes with the drawback of having to compute the KRR estimator $\alpha$. A straightforward solution for the KRR estimator $\alpha$ involves inverting the kernel matrix, which uses $O(n^3)$ operations. Furthermore, storing the original kernel consumes $O(n^2)$ memory spaces. As the number n of points in the training dataset increases, the speed of the KRR algorithm slows cubically and its memory consumption increases quadratically, which become prohibitively cumbersome for large training datasets.

Embodiments of the invention provide devices, systems, and methods for accelerating KRR machine learning algorithms by "preconditioning" a kernel using randomized decomposition. Preconditioning converts each KRR training computation, e.g., $(K+\beta I)\alpha = b$ in equation (2), into a preconditioned computation, e.g., $P(K+\beta I)\alpha = Pb$, where P is a preconditioner matrix, e.g., $P \triangleq (\tilde{K}+\beta I)^{-1}$, and $\tilde{K}$ is a low-rank or reduced-rank approximation of the kernel K. Reduced-rank kernel $\tilde{K}$ is generated to be within a sufficiently close approximation of the initial kernel K e.g., by generating $\tilde{K}$ as a matrix decomposition of K and/or by bounding the difference $\|\tilde{K}-K\|$ therebetween (e.g., as shown in equation (10)). The KRR model $\alpha$ may be solved by performing a numerical iterative technique, such as the conjugate gradient method, executed over a number of iterations until the KRR solution $\alpha$ converges (e.g., to within a threshold error or accuracy) or until a threshold number of iterations are executed. Because the preconditioner (e.g., $P \triangleq (\tilde{K}+\beta I)^{-1}$) is built using a reduced-rank kernel approximation $\tilde{K}$, such preconditioning reduces the condition number of the preconditioned system of KRR equations, $P(K+\beta I)$, relative to the original non-preconditioned system, $(K+\beta I)$, and thereby reduces the number of iterations used to train the KRR solution $\alpha$ to converge.

The reduced-rank kernel $\tilde{K}$ and its preconditioner should be carefully constructed to ensure they preserve the structure of the initial kernel K to enable their application using fast matrix multiplication techniques, such as the Fast Improved Gauss (FIG) Transform. For example, $\tilde{K}$ may preserve the Gaussian structure (e.g., $k_{ij} = e^{(\|x_i - y_j\|^2)}$) of kernel matrix K, such that, the FIG-transform, induced by $\tilde{K}$, may be used for the preconditioned system.

Accordingly, embodiments of the invention generate a reduced-rank approximation kernel $\tilde{K}$ that is a similar approximation, and preserves the structure, of the original kernel, $\tilde{K} \approx K$. In this way, preconditioned kernel multiplication $\tilde{K}\alpha$ may be computed using the fast matrix multiplication techniques in O(n) operations, combined with the benefits of preconditioning that significantly reduces the number of iterations required for the KRR solution to converge. In one embodiment, combining a fast multiplication technique, such as, a FIG-transform, with a preconditioned KRR system solved by an iterative process, such as, the conjugate gradient method, for fast KRR convergence, may be executed in O(nt) total operations (including O(n) operations per iteration and t total iterations to converge), which is significantly faster than solving a conventional (non-preconditioned) KRR model using the conjugate gradient method performed in $O(n^2T)$ total operations (including $O(n^2)$ operations per iteration and T total iterations to converge, where T>>t) or in $O(n^3T)$ total operations using direct matrix inversion. For example, FIGS. 3A-4D show that example implementations of embodiments of the invention (solid lines (b)) converge to below-threshold error in significantly faster than conventional KRR algorithm with no preconditioner (dashed curves (a)).

The reduced-rank approximation kernel $\tilde{K}$ may be computed using a variety of methods to approximate the original kernel K. In one embodiment, a CUR low rank approximation may approximate kernel K by reducing the columns C and rows R e.g., as:

$$K_{m \times n} \approx C_{m \times k} U_{k \times k} R_{k \times n} = \tilde{K} \quad (3)$$

where C is a subset of k of the n columns of kernel matrix K and R is a subset of k of the m rows of kernel matrix K. Additionally or alternatively, when kernel K is symmetric (m=n), a Nyström approximation may approximate the kernel K by a subset of k of the n columns C e.g., as:

$$K_{n \times n} \approx C_{n \times k} U_{k \times k} C_{k \times n}^T = \tilde{K} \quad (4)$$

During training, K is typically symmetric. Because the original kernel K has a structure that can be computed using fast matrix multiplication techniques, e.g., the FIG-transform, so too can its subset of columns C and thus, its reduced-rank approximation $\tilde{K}$ e.g., in equations (3) or (4).

In order to choose the optimal columns of $\tilde{K}$ (in Nyström approximation, e.g., equation (4)), or columns and rows (in CUR approximation, e.g., equation (3)) to optimize speed and accuracy, embodiments of the invention may select "anchor points." Anchor points represent the index or identity of the subset C of columns and subset R of rows (in CUR decomposition) or the subset C of columns/rows (equivalent when K is symmetric) (in Nyström approximation) used to approximate kernel matrix K. The number of anchor points selected, k, may be less than the number of columns n and/or rows m. Embodiments of the invention may select anchor points using randomized matrix factorizations (e.g., random interpolative decomposition) e.g., as in Algorithm 1. Randomization may be used by projecting the kernel onto $\ell$ (e.g., >k) random vectors. This projection may be executed by applying the kernel K to a random matrix $\Omega$, e.g., using fast matrix multiplication such as the FIG transform, to generate randomized kernel projection Y. Fast matrix multiplication allows multiplication of the kernel K, without generating the kernel K itself. This projection reduces the dimension of the matrix to a reduced dimensional space (e.g., the size/dimensions of the random kernel projection matrix Y is/are smaller than that of the initial kernel K). To further accelerate the randomized matrix factorizations, some embodiments use sparse projections, wherein the random matrix $\Omega$ is sparse (e.g., with a user-selectable minority of non-zero values, such as, less than 5%, 2% or 1%). A rank-revealing decomposition technique, such as, Rank Revealing QR (RRQR)-based or Rank Revealing LU (RRLU)-based, is then used to decompose randomized kernel projection Y to generate a rank-revealing decomposition with a permutation matrix $\Pi$ that reorders the columns and/or rows of, and approximates, randomized kernel projection Y. The top k ordered columns and/or rows of the permutation matrix $\Pi$ may be selected as the anchor points. Solving RRQR on the randomized kernel projection Y may use significantly fewer (e.g., $O(nl^2)$) operations than solving RRQR on the original full kernel K (e.g., which typically uses $O(n^2l)$ operations, where l<<n). Additionally or alternatively, anchor points may be selected by random sampling, farthest point sampling (FPS), or other methods.

In summary, embodiments of the invention accelerate the KKR solution using a preconditioner P that lowers the kernel condition number for faster convergence (with fewer KRR iterations), while maintaining a (e.g., Gaussian) structure to allow fast matrix multiplication (e.g., FIG transform) for fast KRR computations. Embodiments of the invention combines randomized decomposition to select "anchor points" indexing a subset of kernel columns and/or rows used to construct a reduced rank kernel, matrix decomposition (e.g., CUR or Nyström approximation) to generate the reduced rank kernel, fast matrix multiplication (e.g., Fast Gauss Transform (FGT), Fast Improved Gauss (FIG) transform, or Fast Multipole methods) to compute products in the KRR algorithm such as applying the preconditioner, and an iterative algorithm (e.g., conjugate gradient method) to solve the preconditioned KRR system. This results in an efficient preconditioner that accelerates solving the KRR algorithm in an order of operations and order of memory space that is linear with the number of training data points n (e.g., O(n) operations and O(n) memory space). FIGS. 3A-4D show a comparison between solving a conventional KRR algorithm (dashed line (a)) and a KRR algorithm according to an embodiment of the invention (solid line (b)). Each graph shows a measure of KRR solution accuracy or error (y-axis) vs. number of iterations of the KRR solution (x-axis). In all graphs, the KRR algorithm according to an embodiment of the invention (solid line (b)) converges significantly faster than the conventional KRR algorithm (dashed line (a)). Further, in all graphs, the KRR algorithm according to an embodiment of the invention (solid line (b)) is more accurate or has less error than the conventional KRR algorithm (dashed line (a)) for the same number of iterations.

Embodiments of the invention further determine an upper bound of the condition number of the preconditioned matrix, e.g., $P(K+\beta I)$ or $(\tilde{K}+\beta I)^{-1}(K+\beta I)$, wherein the condition number is used to determine or set the number of iterations for a desired accuracy of the KRR solution. Additionally or alternatively, for a Gaussian kernel, embodiments of the invention determine a lower bound for the low rank approximation used to reach the desired condition number. This bound may be calculated directly from the training data, without analyzing the initial kernel K.

Reference is made to FIG. 1, which schematically illustrates data structures for accelerating a machine learning KRR algorithm by preconditioning a kernel using randomized decomposition, in accordance with some embodiments of the invention.

Figure 2:
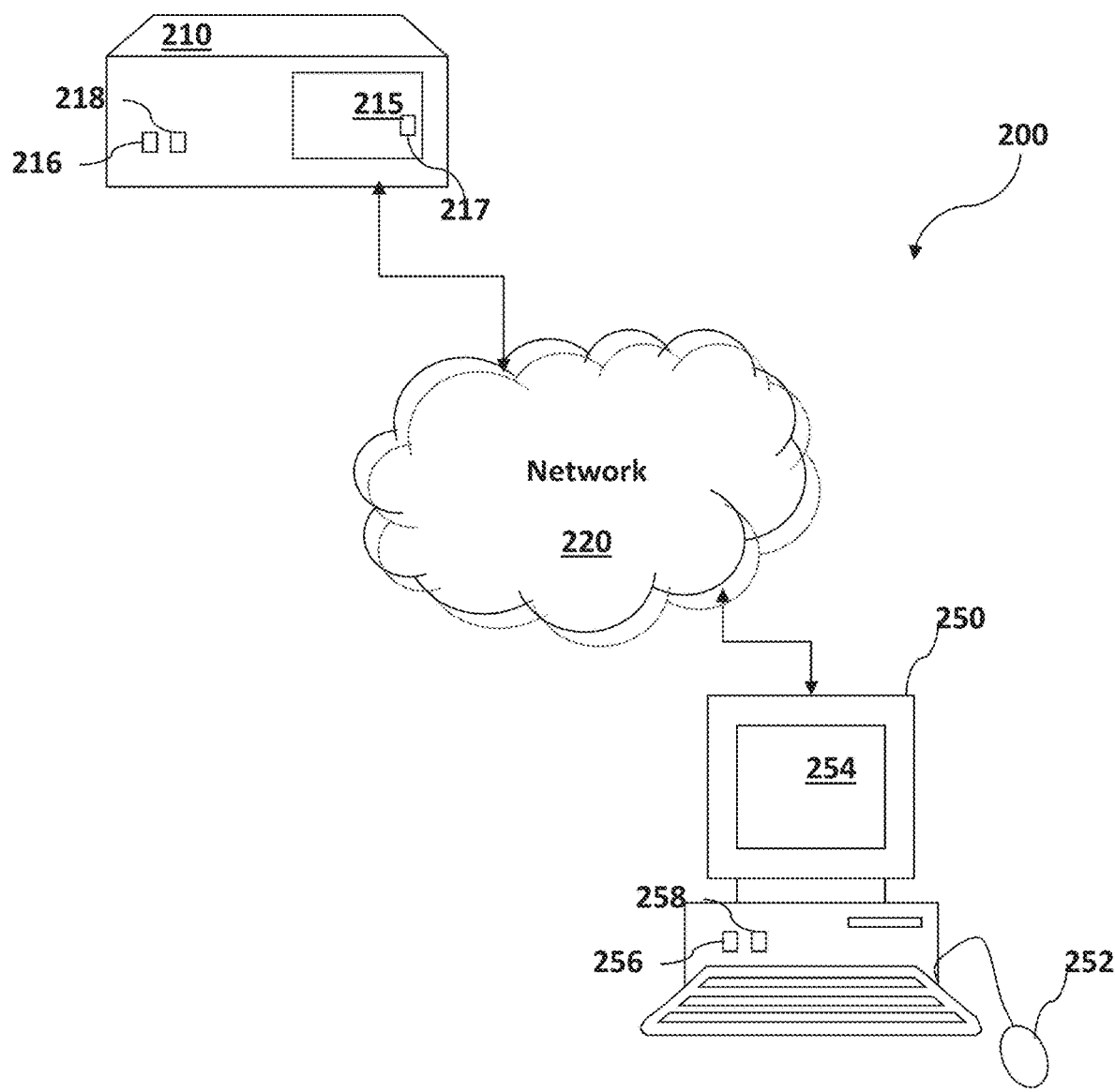
FIG. 2 schematically illustrates a machine learning system for fast and accurate machine learning by applying an efficient preconditioner to kernel ridge regression in accordance with some embodiments of the invention.

A training dataset X 102 may be generated or obtained and may be stored (e.g., in memory units 218 and/or 258 of FIG. 2).

A processor (e.g., one or more processor(s) 216 and/or 256 of FIG. 2) may perform a randomized interpolative decomposition of an initial kernel K of the training dataset X 102, without generating the initial kernel K itself. The interpolative decomposition may be a CUR decomposition (e.g., equation (3)) or a Nyström approximation for a symmetric kernel (e.g., equation (4)). For example, the Nyström approximated reduced-rank kernel may be e.g., $\tilde{K}=CUC^T$, where $C \in \mathbb{R}^{n \times k}$ is a subset of columns of K and $U \in \mathbb{R}^{k \times k}$ is an inverse of a submatrix of C.

To randomize the decomposition of the initial kernel K, the processor may generate a random matrix $\Omega$ 104. The processor may project the initial kernel K onto the random matrix $\Omega$ 104 in a lower dimensional space, to generate randomized kernel projection Y 106. The projection is performed by fast matrix multiplication, which computes products of matrices without generating the matrices themselves (e.g., without generating the initial kernel K). In some embodiments, the processor may accelerate the randomized decomposition by performing sparse projections using a sparse random matrix $\Omega$ 104. The processor may permute the randomized kernel projection Y 106 (e.g., by Rank Revealing QR (RRQR)) to reorder its columns and/or rows to better (or best) approximate the initial kernel K. The processor may select a plurality of anchor points representing a subset of the top ordered columns and/or rows based on their permuted order.

The processor may generate a reduced-rank kernel $\tilde{K}$ 108 comprising the subset of columns and/or rows (or derivation thereof) represented by the selected anchor points. The reduced-rank kernel $\tilde{K}$ 108 may approximate the initial kernel K with a relatively lower rank than the initial kernel K. The reduced-rank kernel $\tilde{K}$ 108 may be within a sufficiently close approximation of the initial kernel K e.g., by using interpolative decomposition and/or bounding the difference, e.g., $\|\tilde{K}-K\|$ as in equation (10). The reduced-rank kernel $\tilde{K}$ 108 may also share the structure of the initial kernel K, such that fast matrix multiplication which could be applied to the initial kernel may also be applied to the reduced-rank kernel $\tilde{K}$ 108 and its associated preconditioner. In some embodiments, for a Gaussian kernel K, the processor may determine a lower bound for the lower rank defining a number of the anchor points to select to reach a desired condition number of the preconditioned KRR system. In some embodiments, the processor may determine the lower bound directly from the training dataset, without generating or analyzing the initial kernel K.

The processor may generate a preconditioner, e.g., $P \triangleq (\tilde{K}+\beta I)^{-1}$, based on the reduced-rank kernel $\tilde{K}$ 108. The processor may precondition the KRR system 110 by applying the preconditioner to the KRR system, e.g., $(K+\beta I)\alpha=b$. The processor may precondition the system using a fast matrix multiplication method, such as, the FIG transform.

The processor may solve the preconditioned KRR system 110 to generate a trained model $\alpha$ 112. The processor may perform an iterative algorithm (e.g., conjugate gradient method) to solve KRR system 110. The processor may run the iterative algorithm until the solution to the trained model $\alpha$ 112 converges (e.g., within a threshold error) or a threshold number of iterations are performed. In some embodiments, the processor may determine an upper bound to a condition number of the preconditioned KRR system 110 to set or determine a number of iterations for solving the preconditioned KRR system associated with a desired level of accuracy.

Embodiments of the invention may use the following techniques:

Randomized Decomposition

Randomized decomposition or factorization may be performed using interpolative decompositions (ID). Interpolative decompositions (ID) may factor or decompose any matrix A, e.g., as $A_{m \times n} \approx B_{m \times k} G_{k \times n}$, where B is a subset of k-columns of A and G is an interpolation matrix with properties (such as a small norm) that is used to efficiently reconstruct A from B. The columns of B may be computed by rank revealing factorization in order to get an error $\|A-BG\|$ bounded by a factor proportional to the k singular value of A. Additionally or alternatively to the deterministic algorithm for computing the ID, embodiments of the invention may use a randomized version of ID that starts by projecting A onto a relatively lower dimensional space using a random matrix (e.g., a sparse matrix, a dense matrix, a normally distributed matrix, etc.). This randomization is used in Algorithm 1.

CUR decomposition is a decomposition that factors a matrix A into three matrices, where C and R are subsets of the columns and rows of A respectively, and U may be defined as the inverse matrix of the overlap between C and R. Most of the matrices discussed herein may be symmetric, in which case the Nyström approximation may be used as a special case of the CUR decomposition. An upper bound may be determined for the error of the CUR decomposition (e.g., $\|A-CUR\|$) using columns and rows selected by the interpolative decomposition, e.g., as follows: Let $A \in \mathbb{R}^{m \times n}$, that satisfies $A=CV^T+E$ and $A=WR+\tilde{E}$, where C, R are the k columns and k rows of A, respectively, and W, $V^T$ are the interpolation matrices from the interpolative decomposition. If R is full rank, and $U \in \mathbb{R}^{k \times k}$ is defined as $U=V^T R^\dagger$, then:

$$\|A-CUR\| \leq \|E\|+\|\tilde{E}\| \qquad (5)$$

Note that $\|E\| \leq p(n,k)\sigma_{k+1}$. Furthermore, for the deterministic ID, $p(n, k)=\sqrt{1+k(n-k)}$. A similar bound exists for the randomized ID.

Fast matrix multiplications may include Fast Gauss Transform, Fast Improved Gauss (FIG) transform, Fast Multipole, or other fast multiplication methods. Fast Gauss Transform (FGT) is a variant of the fast multipole method (FMM). FMM is an efficient method for complex calculations, efficiently performing matrix-vector products. FGT evaluates the discrete Gauss transform, e.g. as: $G(y_j)=\sum_{i=1}^N h_i e^{-\|y_j-x_i\|^2/\in}$, where $\{x_i\}_{i=1}^N$, $x_i \in \mathbb{R}^d$ represent the centers of the Gaussians, each of which has bandwidth $\in$, and $h_i$ are the weight coefficients for each Gaussian. Direct evaluation of the summation for a set of points, $\{y_j\}_{j=1}^M$, $y_j \in \mathbb{R}^d$, may be computationally costly in large scale scenarios, as it requires O(MN) operations. FGT allows a user to set a desired degree of precision $\Delta$ for the approximation of the Gaussian function, and reduces the complexity of the summation in the discrete Gauss transform, $G(y_j)$, to O(M+N). This order, O(M+N), however, includes a hidden constant that grows exponentially in d. To overcome this disadvantage, which makes conventional FGT inapplicable to high-dimensional data, the Fast Improved Gauss (FIG) transform uses tree data structures and an adaptive space subdivision technique, leading to reduction of the constant factor to asymptotically polynomial order. The computational complexity is typically dependent on the data as well as the selection of $\in$. The Fast Improved Gauss (FIG) transform may be used as follows. Let FIG(X, Y, $\in$, q) represent the application of the FIG transform to compute the discrete Gauss transform, $G(y_j)$, where $X \in \mathbb{R}^{N \times d}$ and $Y \in \mathbb{R}^{M \times d}$ represent matrices of data points for which the kernel is generated, weighted by the vector $q \in \mathbb{R}^N$. According to this notation, FIG(Y,X,$\epsilon$, q)=FIG*(X,Y,$\epsilon$, q).

Embodiments of the invention may be applied to other kernels that can utilize fast matrix-vector product such as FMM functions.

Embodiments of the invention may use a conjugate gradient technique with a preconditioner designed not only to reduce the condition number, but also to reduce computational cost and memory consumption. In order to keep the time and storage complexity to a minimum, embodiments of the invention may use the Fast Improved Gauss (FIG) transform. If the kernel is Gaussian, then the FIG transform can be used to apply the kernel to any vector in $O(n)$ operations, and the preconditioner may be applied using the FIG transform as well, to keep the advantage of using a Gaussian kernel. In order to achieve this, the kernel may be approximated using a Nyström decomposition, e.g., $\tilde{K}=CUC^T$, where $C \in \mathbb{R}^{n \times k}$ is a subset of columns of K and $U \in \mathbb{R}^{k \times k}$ is the inverse of a submatrix of C. Adding the ridge regression parameter, $\beta$ and using the Woodbury matrix identity gives, e.g.:

$$(\tilde{K}+\beta I)^{-1}=(CUC^T+\beta I)^{-1}=\beta^{-1}I-\beta^{-1}C(\beta U^{-1}+C^TC)^{-1}C^T \quad (6)$$

Since C is a submatrix of K, then the application of both C and $C^T$ to a matrix, can be performed using the FIG transform in $O(n+k)$ operations. $U^{-1}$ is also a subset of K (unlike U itself, which involves matrix inversion) and can therefore be applied in the same way, in $O(k)$ operations. The Woodbury matrix identity involves computing the inverse of $\beta U^{-1}+C^TC$, which is a small matrix of size k×k. Constructing the matrix $\beta U^{-1}+C^TC$ may be performed by the application of the FIG transform to the identity matrix, 1 (of size k) in $O(nk)$ operations. Each application of equation (6) may involve solving the following linear system:

$$(\beta U^{-1}+C^TC)x=b \quad (7)$$

It may be preferable to store the Cholesky factor of the matrix in equation (7), but this matrix tends to be ill-conditioned in large scales. Instead, equation (7) may be modified to e.g.:

$$(\beta I+U^{1/2}C^TCU^{1/2})U^{-1/2}x=U^{1/2}b \quad (8)$$

where the matrix $\beta I+U^{1/2}C^TCU^{1/2}$ is generally more stable, and its Cholesky decomposition can be applied to solve equation (8) for $z=U^{-1/2}x$ and then restoring x using $x=U^{1/2}z$.

$$L^TL=\beta I+U^{1/2}C^TCU^{1/2} \quad (9)$$

where L is the Cholesky factor of size k×k.

According to some embodiments, the KRR algorithm may be performed in two stages:
  Preparation or "setup" stage: Select anchor data points from the dataset and perform some computations to be used later in the iterative stage, such as building the matrix L of the Cholesky decomposition and the matrix $U^{1/2}$.
  Iterative stage: Apply the conjugate gradient technique using the preconditioner that was computed in the preparation stage to solve the KRR algorithm.

Selection of the anchor points may be performed by various techniques, such as random sampling or farthest point sampling (FPS). In some embodiments, anchor points may be selected based on the interpolative decomposition (or based on rank revealing decompositions), which may have the following advantages:
  Interpolative decomposition is strongly related to the CUR decomposition, and therefore also to the Nyström approximation. The interpolative decomposition may be used in embodiments of the invention to yield spectral bounds that can give guarantees for the overall performance of the algorithm.
  Interpolative decomposition selects columns of the input matrix, which enables the usage of the FIG-transform later on in the algorithm.
  Interpolative decomposition has a randomized version, which can be computed (using the FIG-transform) in linear time and the most demanding computational part can be parallelized.

Anchor point selection may be executed, e.g., according to Algorithm 1 as follows:

---

Algorithm 1 AnchorSelection: Select anchor points using randomized interpolative docomposition approch (RRQR)

---

1: Input: X - Dataset, matrix of size n × d.
2: k - Number points to choose (rank),
3: l ≥ k - number of random projections, typically slightly larger than k
4: $\epsilon > 0$ - Width of the Gaussian kernel
5: Output: S - A set of anchor points from X
6: Generate a random matrix $\Omega \in \mathbb{R}^{\times \#}$, s.t. $\omega_{i,j} \sim \mathcal{N}(0,1)$
7: $Y \leftarrow FIG(X, X, \epsilon, \Omega)$  # Apply FIG transform to $\Omega$
8: $Y^T P = QR$ # Apply Strong RRQR to Y, P is a permutation matrix, but can viewed as a vector
9: $S \leftarrow P(1:k)$  # Choose the first k elements in P
10: return S

---

Algorithm 1 uses sampling technique based on interpolative decomposition. When using pivoted QR, the computational complexity is e.g., $O(nl^2)$. In practice, the performance is very similar to RRQR.

Cholesky decomposition may be executed, e.g., according to Algorithm 2 as follows:

---

Algorithm 2 BuildCholesky: Computes the Cholesky decomposition according to Eq. 9

---

1: Input.: X - Dataset, matrix of size n × d,
2: S - Vector of length k,
3: $\beta > 0$ - Ridge parameter,
4: $\epsilon > 0$ - Width of the Gaussian kernel
5: Output: L - Cholesky factor
6: $X_S \leftarrow X(S,:)$, # $X_S$ is a subset of X containing the anchor points
7: $U^{-1} \leftarrow FIG(X_S, X_S, \epsilon)$
8: Using SVD or EVD build $U^{\frac{1}{2}}$
9: $Y \leftarrow FIG(X, X_S, \epsilon, U^{\frac{1}{2}})$
10: $Y \leftarrow \beta I + U^{\frac{1}{2}} FIG(X_S, X, \epsilon, Y)$
11: $Y = L_T L$ # Cholesky decomposition
12: return L, $U^{\frac{1}{2}}$ The computational complexity of Algorithm 2 is, e.g., $O(nk+k^3)$ The preconditioner may be applied to a vector x, e.g., according to Algorithm 3 as follows:

---

Algorithm 3 ApplyPreconditioner: Applies the preconilitioner according to Eq. 6

---

1: Input X - Dataset, maxtrix of size n × d,
2: S - Anchor points, matrix of size k × d
3: β > 0 - Ridge parameter
4: ϵ > 0 - Width of the Gaussian kernel
5: L - Cholesky factor
6: x - Input vector of length n.
7: Output: r - The application of the reconditioner $(\tilde{K} + \beta I)^{-1}$ of x.

8: $X_S \leftarrow X(S,:)$, # $X_S$ is a subset of X conditing the anchor points 9: $y \leftarrow U^{\frac{1}{2}} FIG(X_S, X, \epsilon, x)$ 10: Solve $L^T L z' = y$ # back substitution 11: $z \leftarrow U^{\frac{1}{2}} z'$ 12: $r \leftarrow \beta^{-1} x - \beta^{-1} FIG(X, X_S, \epsilon, z)$ 13: return r

---

Applying the preconditioner (Algorithm 3) in each iteration takes e.g., $O(n+k^2)$ operations.

The KRR algorithm may be solved, e.g., according to Algorithm 4 as follows:

---

Algorithm 4 SolveKRR: Solves the Gaussian kernel ridge regression

---

1: Input: X - Dataset, matrix of size n × d.
2: β > 0 - Ridge parameter
3: ϵ > 0 - Width of the Gaussian kernel
4: k - Number of points to sample.
5: l ≥ k - Number of random projections to use.
6: b - vector of length n.
7: Output: x - The solution to the equation $(K + \beta I)x = b$.
8: Select anchor points S from X using Algorithm 1.
9: Build the Cholesky factor L using Algorithm 2.
10: Solve $(K + \beta I)x = b$, using CG, where Kx can be computed by FIG(X,X,ϵ, x) and the preconditioner can be applied using Algorithm 3
11: return x

---

The computational complexity of Algorithm 4, when using pivoted QR in Algorithm 1 is e.g., $O(nl^2+nk+k^3+(n+k^2)t)=O(nl^2+(n+k^2)t)$, where t is the number of iterations used in the conjugate gradient.

Anchor points selection can be performed differently, for example, by random sampling or FPS. When using random sampling or FPS, the estimated bounds may not hold, but may still produce good results in practice and reduce the computational cost of Algorithm 1. For example, the computational complexity of algorithm 1 may be reduced from $O(nl^2)$ operations using pivoted QR to $O(k)$ operations using random sampling.

Detailed Analysis

Embodiments of the invention provide a detailed analysis for determining an upper bound to the condition number of the preconditioned KRR system, e.g., $P(K+\beta I)$, associated with a desired level of accuracy. The condition number may indicate a number of iterations for solving the preconditioned KRR system with that level of accuracy. Furthermore, for a Gaussian kernel, embodiments of the invention determine a lower bound for the rank of the reduced-rank kernel approximation $\tilde{K}$ used to reach the desired condition number of the preconditioned KRR system. The reduced rank may indicate a number of the anchor points that should be selected to reach a desired condition number. This bound may be calculated directly from the training data, without analyzing the kernel K or data derived therefrom.

In some embodiments, the kernel matrix $K \in \mathbb{R}^{n \times n}$ may be a symmetric matrix, and the reduced rank kernel $\tilde{K}=CUC^T$ may be its Nyström approximation. It follows then that, e.g.:

$$\|K-\tilde{K}\| \leq 2\sigma_{k+1}(K) \cdot p(k,n) \qquad (10)$$

where p(k, n) is a function bounded by a low degree polynomial in k and n. This is shown as follows.

By equation (5):

$$\|K-\tilde{K}\| \leq \|E\|+\|\tilde{E}\| \qquad (11)$$

Since K is symmetric, $R=C^T$, and it follows that:

$$\tilde{K}=CUR=CUC^T \qquad (12)$$

Hence $\|E\|=\|\tilde{E}\|$, and therefore it follows that:

$$\|K-\tilde{K}\| \leq 2\|E\| \qquad (13)$$

Further, by the definition of RRQR, the decomposition satisfies:

$$\|E\| \leq \sigma_{k+1}(K) \cdot p(n,k) \qquad (14)$$

Combining equations (13) and (14) yields:

$$\|K-\tilde{K}\| \leq 2\sigma_{k+1}(K) \cdot p(n,k) \qquad (15)$$

In some embodiments, the kernel matrix $K \in \mathbb{R}^{n \times n}$ may be a positive semidefinite matrix, and the reduced rank kernel $\tilde{K}=CUC^T$ may be its Nyström approximation. It may be inferred directly from the Shur's complement of K that:

$$K-\tilde{K} \geq 0 \qquad (16)$$

In some embodiments, for any two matrices A, $B \in \mathbb{C}^{m \times n}$, the following holds:

$$|\sigma_i(A)-\sigma_i(B)| \leq \|A-B\| \qquad (17)$$

where $\sigma_i(A)$ is the ith singular value of A.

The numerical rank of the Gaussian kernel $G_\epsilon^X$ up to precision $\delta \leq 0$ is e.g.:

$$\rho_\delta(G_\epsilon^X) \stackrel{\Delta}{=} \#\left[j : \frac{\sigma_j(G_\epsilon^X)}{\sigma_1(G_\epsilon^X)} \geq \delta\right] \qquad (18)$$

Let $X=\{x_i\}_{i=1}^n \in \mathbb{R}^d$ be a set bounded by a box $B=I_1 \times I_2 \times \ldots I_d$, where $I_1, I_2, \ldots, I_d$ are intervals in $\mathbb{R}$. Let $q_i$ be the length of the ith interval, e.g., $q_i=|I_i|$ and let $G_\epsilon^X$ be the associated kernel matrix, e.g., $(G_\epsilon^X)_{i,j}=g_\epsilon(x_i,x_j)$, then:

$$\rho_\delta(G_\epsilon^X) \leq \prod_{i=1}^d (\lfloor \gamma q_i \rfloor + 1), \qquad (19)$$

where $$\gamma = \frac{2}{\pi}\sqrt{\epsilon^{-1} \ln \delta^{-1}}.$$

In some embodiments, the kernel matrix $K \in \mathbb{R}^{n \times n}$ may be a positive semidefinite matrix, and the reduced rank kernel $\tilde{K} \in \mathbb{R}^{n \times n}$ may be its Nyström approximation, such that $\|K-\tilde{K}\| \leq M\sigma_{k+1}(K)$, for a positive constant M (that may depend on n and k) and a ridge parameter $\beta > 0$. According to some embodiments of the invention, the condition number may have the following upper bound, e.g.:

$$cond\left[(\tilde{K}+\beta I)^{-1}+(K+\beta I)\right] \leq 1 + \frac{M\lambda_{k+1}(K)}{\beta} \qquad (20)$$

This is shown as follows.

When K and $\tilde{K}$ are positive semidefinite matrices, combining equations (16) and (17) gives, e.g.:

$$0 \leq K - \tilde{K} \leq \|K-\tilde{K}\| I \leq M\sigma_{k+1}(K) = M\lambda_{k+1}(K) \qquad (21)$$

Modifying equation (21) and adding $\beta I$ gives:

$$\tilde{K}+\beta I \leq K+\beta I \leq \tilde{K}+\beta I + M\lambda_{k+1}(K)I \qquad (22)$$

Applying $(\tilde{K}+\beta I)^{-1/2}$ to both sides of equation (22) and using the fact that $(\tilde{K}+\beta I)^{-1/2}$ is symmetric positive semidefinite, gives:

$$I \leq (\tilde{K}+\beta I)^{-1/2}(K+\beta I)(\tilde{K}+\beta I)^{-1/2} \leq I + M\lambda_{k+1}(K)(\tilde{K}+\beta I)^{-1} \qquad (23)$$

Because $(\tilde{K}+\beta I)^{-1} \leq \beta^{-1} I$, this yields:

$$I \leq (\tilde{K}+\beta I)^{-\frac{1}{2}}+(K+\beta I)(\tilde{K}+\beta I)^{-\frac{1}{2}} \leq 1 + \frac{M\lambda_{k+1}(K)}{\beta} I \qquad (24)$$

Evaluating the condition numbers of the middle term in equation (24):

$$cond\left[(\tilde{K}+\beta I)^{-1}+(K+\beta I)\right] = \qquad (25)$$
$$cond\left[(\tilde{K}+\beta I)^{-\frac{1}{2}}(K+\beta I)(\tilde{K}+\beta I)^{-\frac{1}{2}}\right] \leq 1 + \frac{M\lambda_{k+1}(K)}{\beta}$$

which defines the upper bound of the condition number in equation (20).

In some embodiments, K may be a Gaussian kernel matrix over dataset $X \in \mathbb{R}^d$, e.g. $K = G_\in^X$. Let $\tilde{K}$ be a rank k Nyström approximation, such that $\|K-\tilde{K}\| \leq M(n,k)\sigma_{k+1}(K)$ and let $\beta$ be a ridge parameter. Then, for a maximal condition number, $\xi$:

$$k \geq \prod_{i=1}^{d}\left(\left\lceil\frac{2q_i}{\pi}\sqrt{\epsilon^{-1}\ln\frac{Mn}{\beta(\xi-1)}}\right\rceil + 1\right) \qquad (26)$$

where $\{q_i\}_{i=1}^{d}$ are the lengths of the intervals of the bounding box of the dataset X. This is shown as follows.

From equation (20), the condition number depends on $\lambda_{k+1}(K)$, e.g., as:

$$cond\left[(\tilde{K}+\beta I)^{-1}+(K+\beta I)\right] \leq 1 + \frac{M\lambda_{k+1}(K)}{\beta} \leq \xi \qquad (27)$$

where $M \triangleq \sup M(k)$. Therefore, $\lambda_{k+1}(K)$ satisfies $$\lambda_{k+1}(K) \leq \frac{\beta(\varepsilon-1)}{M}.$$

By defining $$\delta = \frac{\beta(\varepsilon-1)}{M\|K\|},$$

and using equation (19):

$$\gamma = \frac{2}{\pi}\sqrt{\epsilon^{-1}\ln\delta^{-1}} \leq \frac{2}{\pi}\sqrt{\epsilon^{-1}\ln\frac{Mn}{\beta(\xi-1)}} \qquad (28)$$

Therefore, the result of equation (26) follows.

Using equation (26), embodiments of the invention determine the required rank of the Nyström approximation and illustrates the tradeoff between the condition number and the low rank, which has implications over the memory consumption and computational load of the algorithm. For instance, using a smaller condition number yields fewer KRR iterations on one hand, but on the other hand generally results in processing a larger matrix $\tilde{K}$. In some embodiments, condition number may refer to a measure of how stable or sensitive a function is to changes or errors in the input, e.g., how much an output value of the function can change for a small change in the input.

As a simple example, for a deterministic interpolative decomposition, $M=\sqrt{k(n-k)+1}$, which yields $$M = \sqrt{\frac{n^2}{4}+1} \approx \frac{n}{2}.$$

Equation (28) grows very slowly in n, which means that k remains small even when n grows fast. For example, suppose $M=n/2$, $\in=1$, $\xi=2$ and $\beta=1$, then for $n=10^6$, $\gamma=3.3$ and for $n=10^8$, $\gamma=3.82$ which does not affect the value of k according to equation (26).

For a Nyström preconditioner built by choosing $\tilde{K}=CUC^T$, where C represents the columns of K chosen by the interpolative decomposition, then:

$$cond\left[(\tilde{K}+\beta I)^{-1}(K+\beta I)\right] \leq \qquad (29)$$
$$1 + \frac{2\lambda_{k+1}(K)\sqrt{k(n-k)+1}}{\beta} \leq 1 + \frac{2\lambda_{k+1}(K)\left(\frac{n}{2}+1\right)}{\beta}$$

This follows directly by combining equations (10) and (19).

A similar bound can be developed by analogous methods for other types of decompositions.

Numerical Results

Tests were conducted to empirically evaluate and compare embodiments of the invention to conventional methods. Two test datasets were used: one to train autonomous helicopter driving models in FIGS. 3A-3F and another to train electromagnetic field simulation models in FIGS. 4A-4D.

Autonomous Driving Training

Reference is made to FIGS. 3A-3F, which are graphs of machine learning results for training autonomous driving models using an example training dataset for autonomous helicopter aerobatics. FIGS. 3A-3F plot results comparing (a) a conventional KRR algorithm with no preconditioner (dashed curves) and (b) a KRR algorithm with randomized interpolative decomposition (RID) preconditioning in accordance with some embodiments of the invention (solid curves).

Figure 3A:
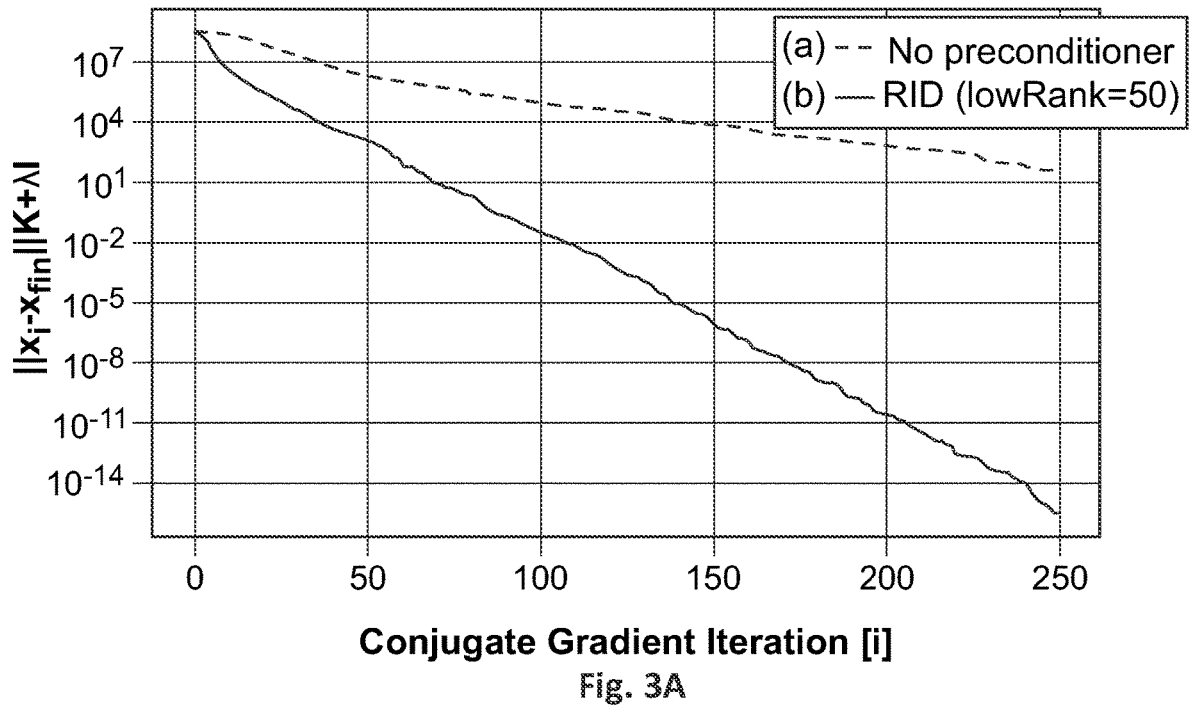
FIGS. 3A-3F are graphs of results for KRR machine learning using an example training dataset for autonomous helicopter aerobatics.
Figure 3B:
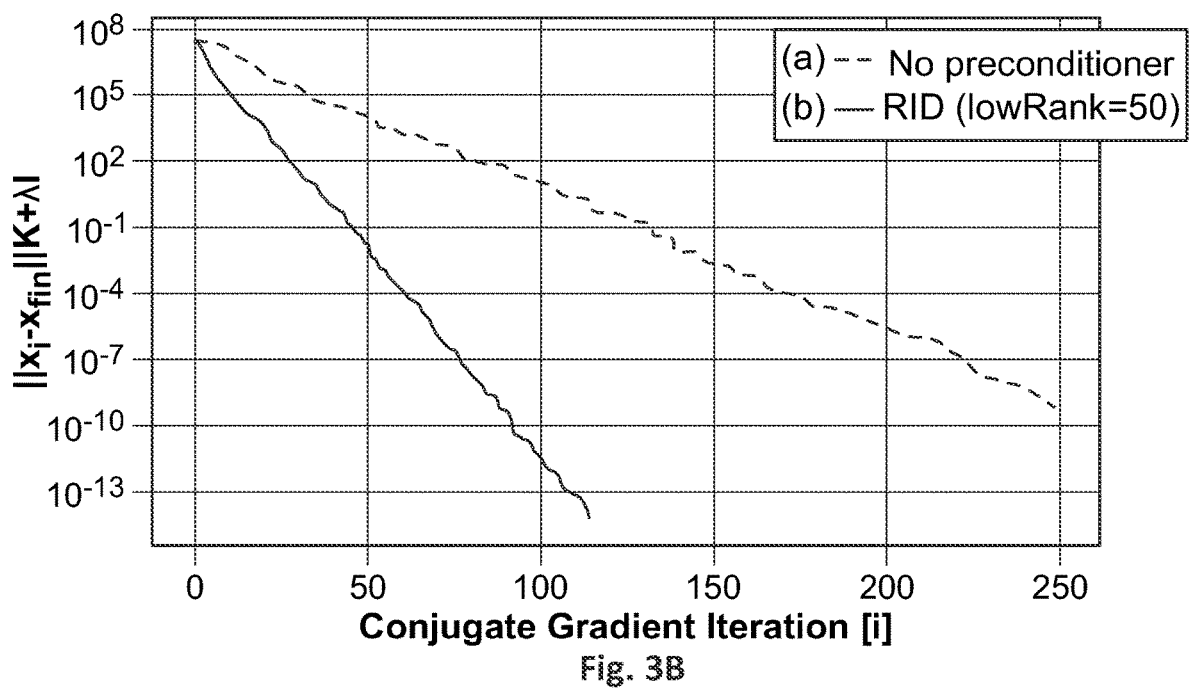

FIGS. 3A and 3B plot accuracy (y-axis) vs. number of algorithm iterations (x-axis) using a dataset of n=100,000 input training datapoints. Accuracy is measured as e.g., $\|\alpha - \alpha_i\|_{K+\beta I}$, which is a difference between the actual solution to the KRR model $\alpha$ and the solution at the ith iteration of the KRR algorithm $\alpha_i$. The number of data points in the training dataset X is n=100,000, the number of anchor points (rank) k=50, and number of random projections l=60. FIGS. 3A and 3B compare results for different noise levels (relatively low noise ($\beta$=0.1) in FIG. 3A and relatively high noise ($\beta$=1) in FIG. 3B). In some embodiments, when the spectral decay of the kernel is relatively fast, a relatively small k may be sufficient for satisfying results.

Figure 3C:
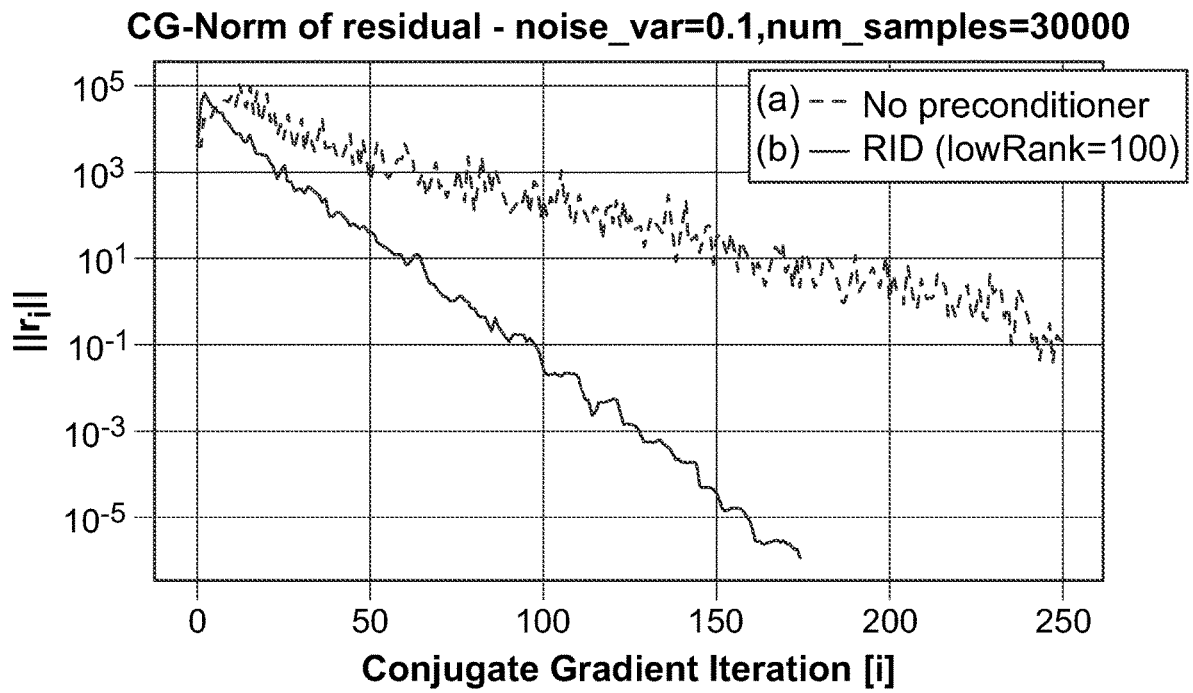
Figure 3D:
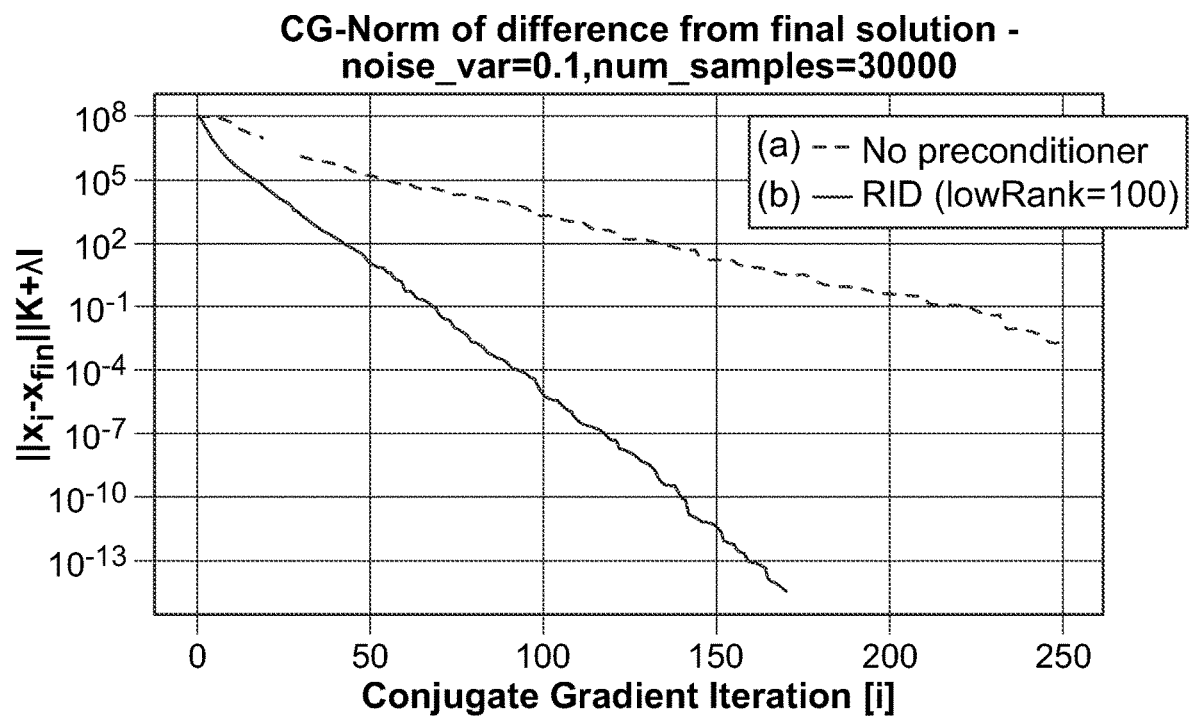

FIG. 3C plots residual error (y-axis) vs. number of algorithm iterations (x-axis). In this example plot, error is measured as $\|r_i\|$, which is the $l^2$ norm of the residual error, r(i)=(K+$\beta$l)$\alpha$(i)−b, where i refers to the iteration number and $\alpha$(i) is the solution at iteration i of the KRR algorithm. FIG. 3D plots accuracy (y-axis) vs. number of algorithm iterations (x-axis). In this example plot, accuracy is measured as the $l^2$ norm $\|\alpha - \alpha_i\|_{K+\beta I}$, which is the distance between the actual solution to the KRR model $\alpha$ and the ith iteration solution $\alpha_i$. Both FIGS. 3C and 3D use a dataset X of n=30,000 input training datapoints, a rank k=100, and a noise level $\beta$=0.1.

Figure 3E:
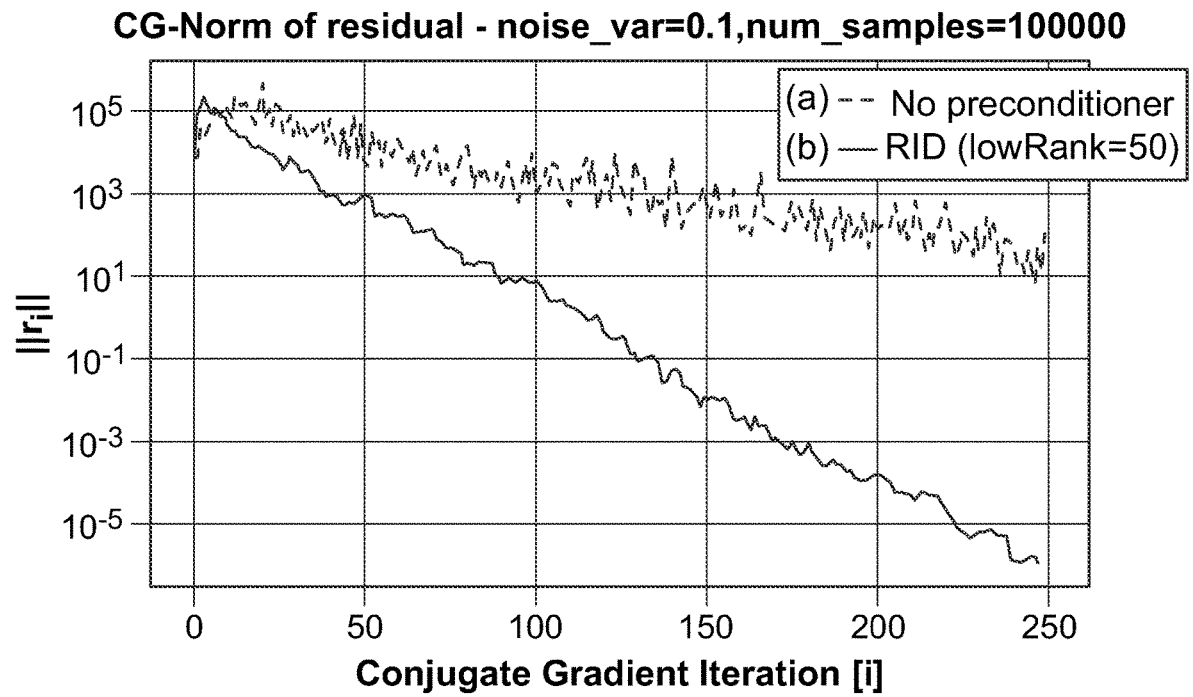
Figure 3F:
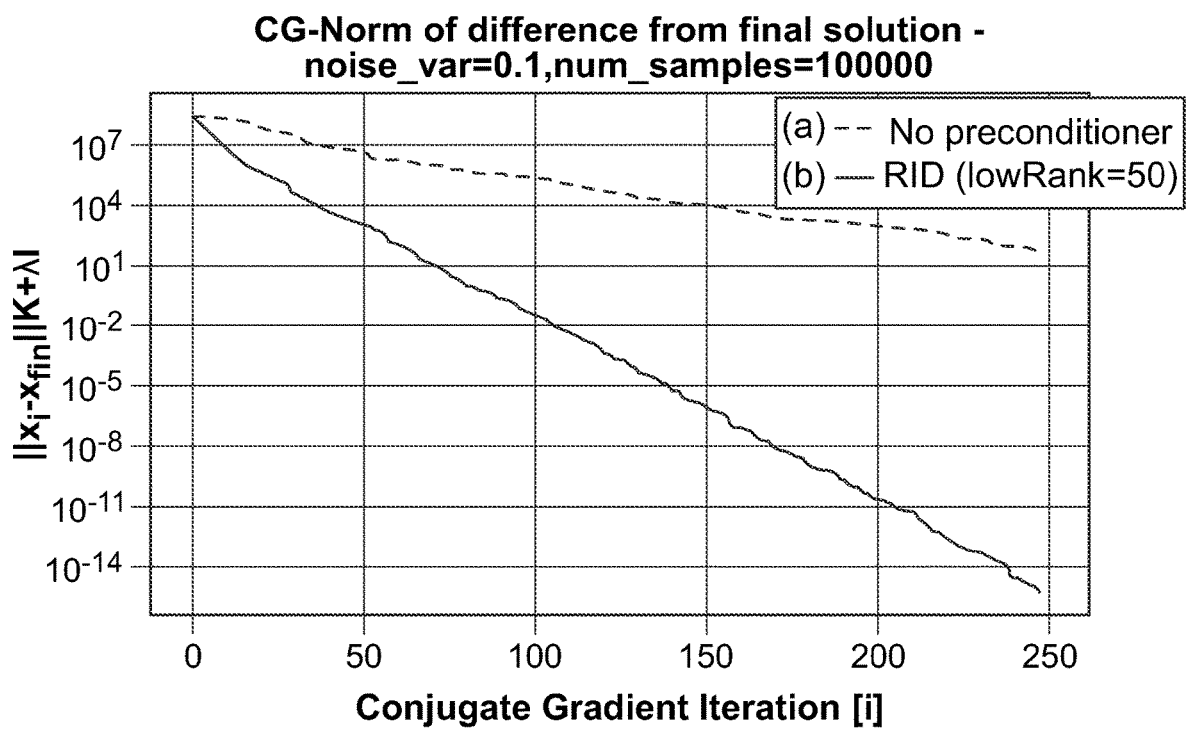

FIG. 3E plots residual error (y-axis) vs. number of algorithm iterations (x-axis) and FIG. 3F plots accuracy (y-axis) vs. number of algorithm iterations (x-axis). Both FIGS. 3E and 3F use a dataset of n=100,000 input training datapoints, rank k=50, and a noise level $\beta$=0.1.

Synthetic Electromagnetic Field Simulator

An example three-dimensional synthetic dataset generated by an electric field simulator was used to test the performance of the algorithm. The simulation was composed of the following parts:

Setting the support of the points to e.g. $[0, 1]^3$

Choosing points from a uniform distribution over the defined support at random, where e.g.:

Five points represent the positive point-charges 30,000 points represent arbitrary sampling locations of the electric field Following the superposition rule, at each sampling point j, each field component was summed e.g., as follows:

$$e_x[j] = \sum_{i=1}^{5} \frac{1}{d_{ij}^2} \sin(\phi)\cos(\phi) \quad (30)$$

$$e_y[j] = \sum_{i=1}^{5} \frac{1}{d_{ij}^2} \sin(\phi)\sin(\phi)$$

$$e_z[j] = \sum_{i=1}^{5} \frac{1}{d_{ij}^2} \cos(\phi)$$

where dij is the distance between charge i and the point j, and $\theta$ and $\phi$ are the spherical angles with respect to axes x and z respectively. Additionally, an electric potential was calculated at each point, to be used as the problem's label e.g., as follows:

$$\Phi[j] = \sum_{i=1}^{5} \frac{1}{d_{ij}} \quad (31)$$

Reference is made to FIGS. 4A-4D, which are graphs showing the results training the electromagnetic field simulation using the above example field containing five positive point charges. FIGS. 4A-4D plot results comparing (a) a conventional KRR algorithm with no preconditioner (dashed curves) and (b) a KRR algorithm with randomized interpolative decomposition (RID) preconditioning in accordance with some embodiments of the invention (solid curves).

Figure 4A:
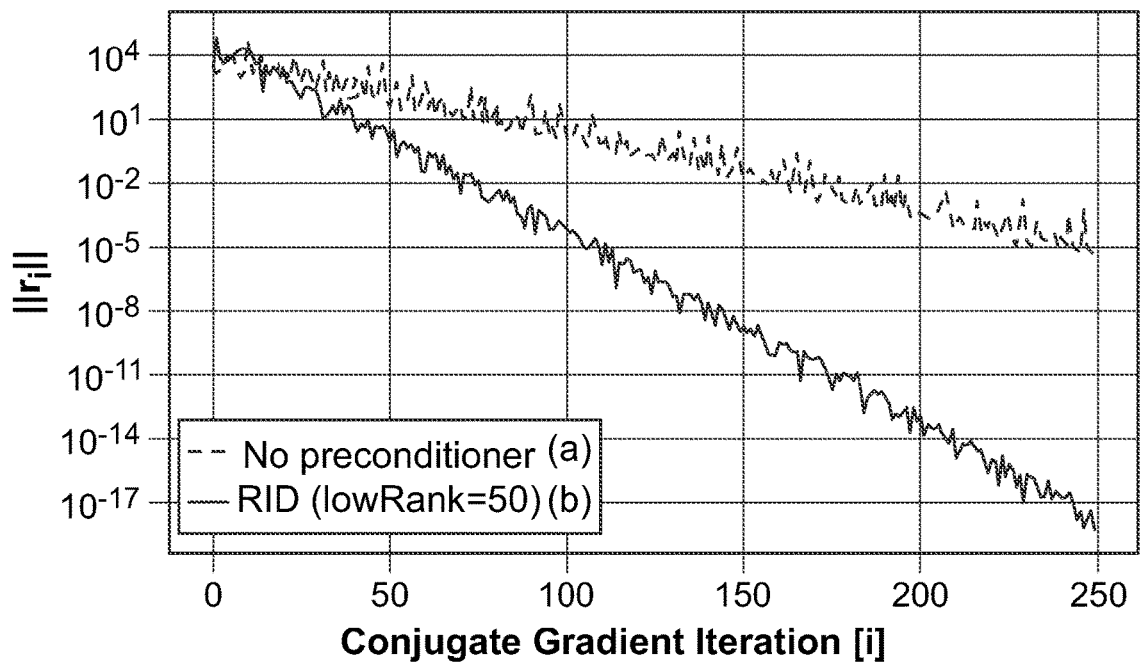
FIGS. 4A-4D are graphs of results for KRR machine learning using an example training dataset for an electromagnetic field simulation.
Figure 4B:
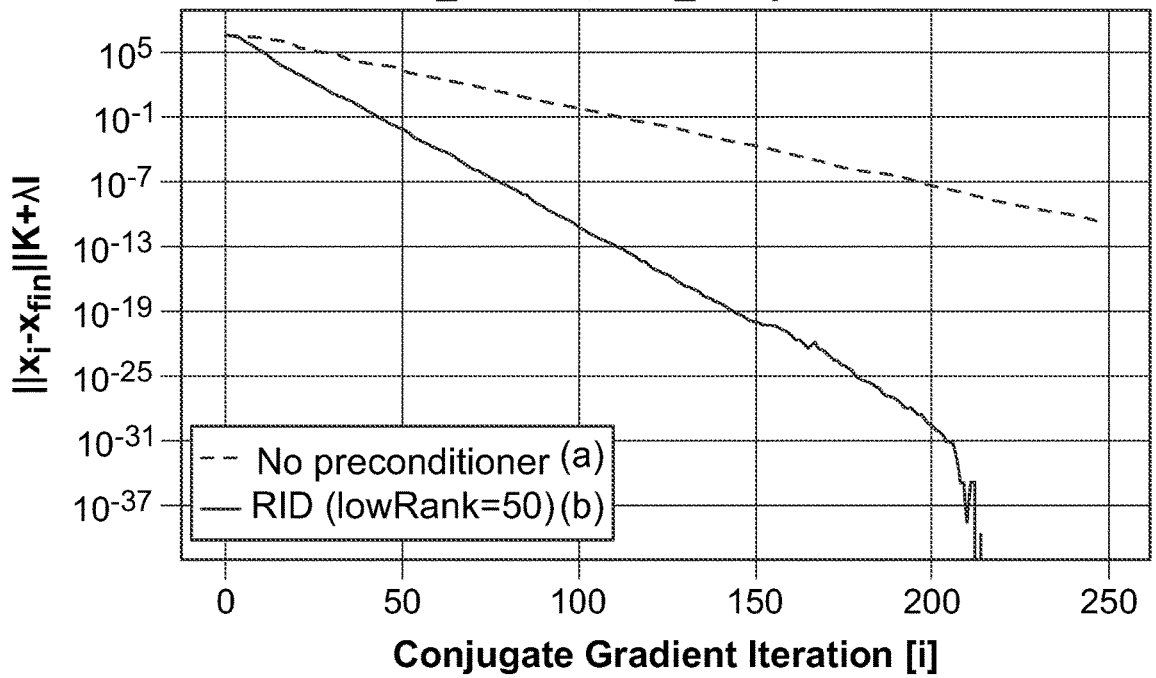
Figure 4C:
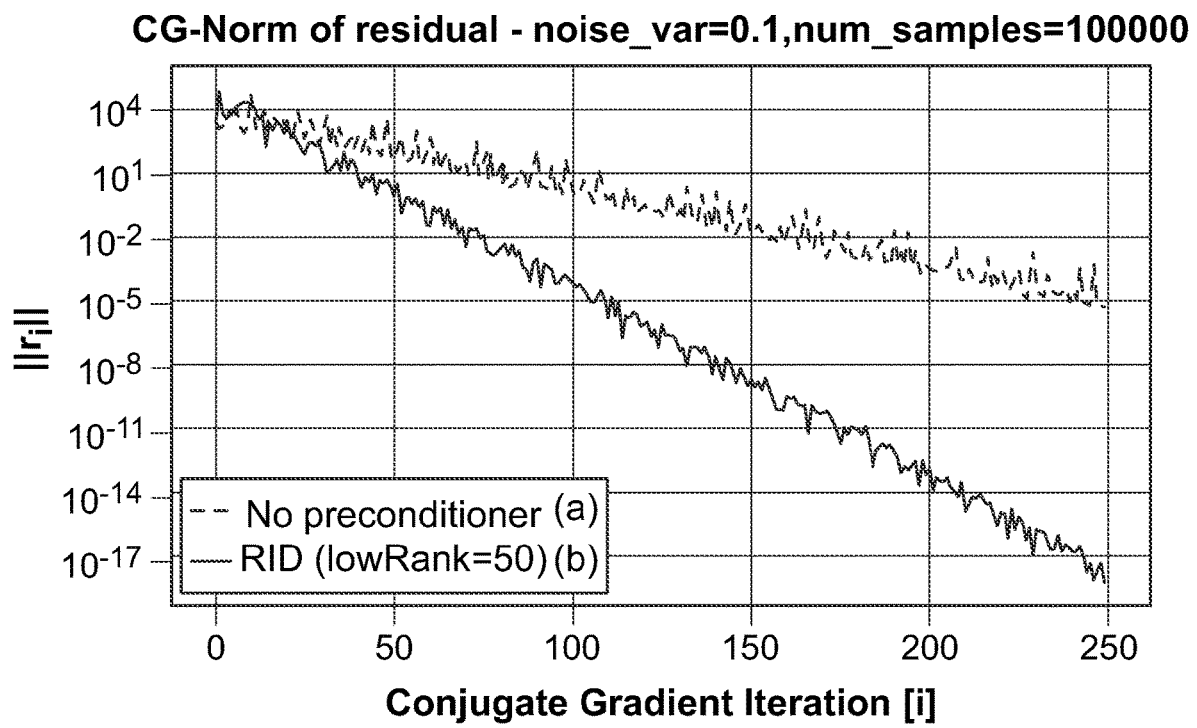
Figure 4D:
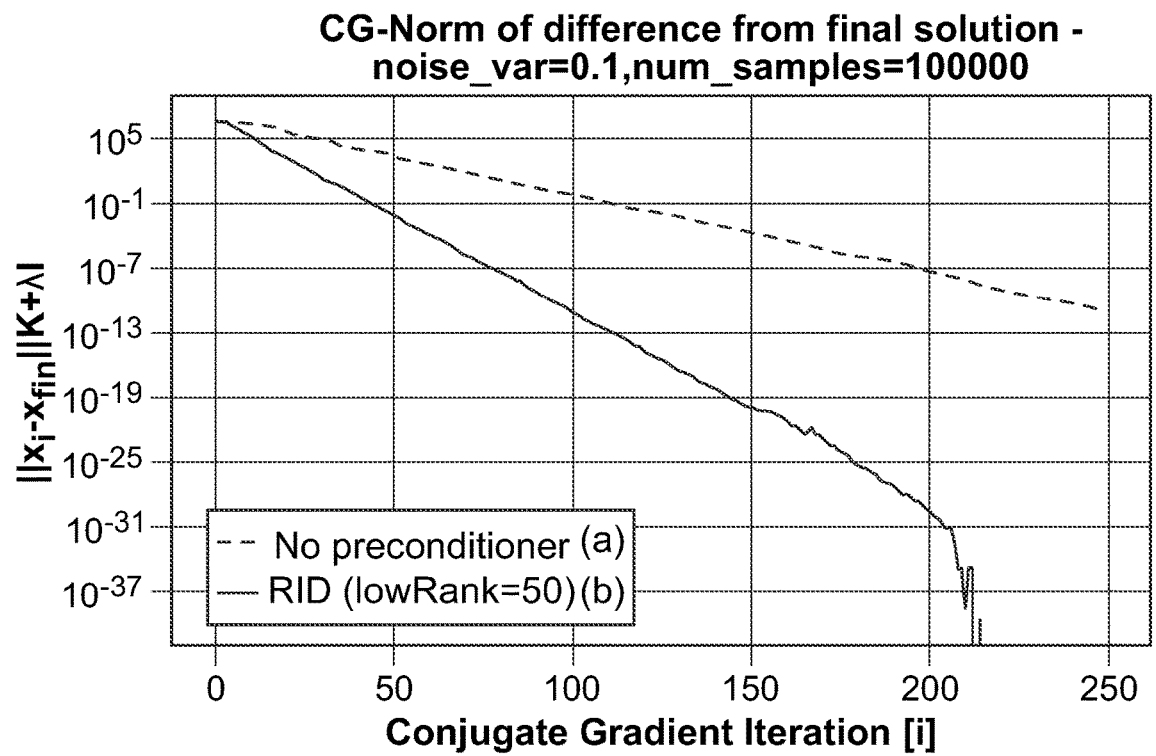

FIGS. 4A and 4C plot residual error (y-axis) vs. number of algorithm iterations (x-axis). FIGS. 4B and 4D plot accuracy (y-axis) vs. number of algorithm iterations (x-axis). FIGS. 4A and 4B use a dataset X of n=30,000 input training datapoints, while FIGS. 4C and 4D use a dataset X of n=100,000 input training datapoints. use a dataset of n=100,000 input training datapoints. All FIGS. 4A-4D use a rank k=50 and a noise level $\beta$=0.1.

System Configuration

Reference is made to FIG. 2, which schematically illustrates a system 200 operating according to some embodiments of the invention. System 200 may store and generate the data structures and implement the training of machine learning algorithms described herein. The above described embodiments may be executed using any single or combination of devices and/or components of system 200 of FIG. 2. Various computer architectures may be used to implement embodiments of the invention, a few of which are discussed here as non-limiting examples.

System 200 may include one or more servers 210, databases 215, and/or user computers or devices 250. The operations and KRR algorithms described herein may be executed locally at user computer 250, remotely at server 210, or distributed across system 200 using a combination of computing effort by user computer 250 and server 210. In some embodiments, server 210 may train the KRR model during a training phase and user computer 250 may user the trained model for inference/prediction in a run-time phase.

Database 215 may include software processes or applications for storing and retrieving data 217 in a storage unit. Database 215 may store data 217 including a training dataset (e.g., the example training dataset for autonomous helicopter aerobatics discussed in reference to FIGS. 3A-3F or the example training dataset for an electromagnetic field simulation discussed in reference to 4A-4D). Data 217 may also include code (e.g., software code) or logic, e.g., to enable storage, retrieval, and/or processing of data 217 according to embodiments of the invention. Database 215 may be internal or external to one or more of servers 210, databases 215, and/or user computers 250, and may be connected thereto by a local or remote and a wired or wireless network 220 connection. In alternate embodiments, data 217 may be stored in an alternate location separate from database 215, e.g., memory unit(s) 258.

User computer 250 may be a personal computer, desktop computer, mobile computer, laptop computer, and notebook computer or any other suitable device such as a cellular telephone, smart device, personal digital assistant (PDA), video game console, etc., and may include wired or wireless connections or modems. User computer 250 may include one or more input device(s) 252 for receiving input from a user (e.g., KRR parameters, such as, selection of the training dataset X or a number of data points desired as a subset of X, the number of anchor points (rank) k, the noise level $\beta$, the number of random projections l, etc. User computer 250 may include one or more output device(s) 254 (e.g., a monitor or screen) for displaying data to a user generated by computer 250 or server 210, such as, the predictive results of running a model trained according to embodiments of the invention, or statistical accuracy results similar to those in FIGS. 3A-4D. In various applications, user computer 250 is part of a system for autonomous driving (implemented in a vehicle computing system), electromagnetic field simulation, image recognition, computer vision, virtual or augmented reality, speech recognition, text understanding, or other applications of machine learning model. In the application of autonomous driving, a vehicle computer 250 may use the trained model to control driving operations, e.g., to steer the vehicle to avoid a detected object.

One or more networks 220 may connects system 100 devices including servers 210, databases 215, and/or user computers 250. Network 220 may be any public or private network such as the Internet. Access to network 220 may be through wire line, terrestrial wireless, satellite or other systems well known in the art.

Server 210 and/or user computer 250 may include one or more processor(s) 216 and 256, respectively, to perform the methods described according to some embodiments of the invention. Processor 216 and/or 256 may generate or retrieve, store, and process data 217. Server 210 and/or user computer 250 may include one or more memory unit(s) 218 and 258, respectively, for storing data 217 and/or instructions (e.g., software for applying methods according to embodiments of the invention) executable by the processor(s). Processor(s) 256 and 216 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 258 and 218 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used, for example, data 217 may be stored in memory 258 and no separate database 215 may be used.

Figure 5:
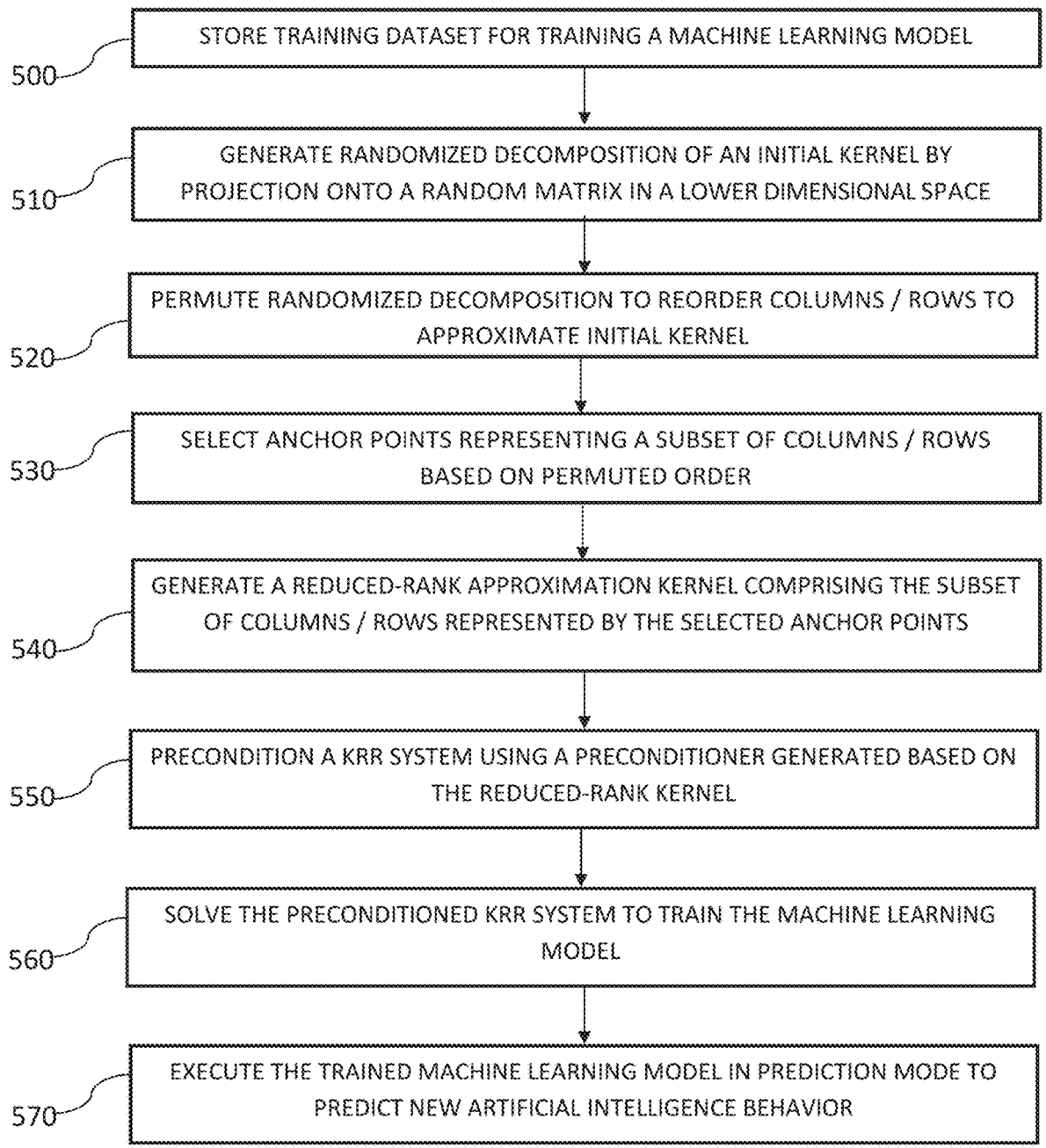
FIG. 5 is a flowchart of a method for an accelerated KRR machine learning algorithm generated by preconditioning a kernel using randomized decomposition in accordance with some embodiments of the invention.

Reference is made to FIG. 5, which is a flowchart of method for accelerating a machine learning KRR algorithm by preconditioning a kernel using randomized decomposition in accordance with some embodiments of the invention. The operations of FIG. 5 may be performed by a processor (e.g., one or more processor(s) 216 and/or 256 of FIG. 2) using a memory (e.g., one or more memory unit(s) 218 and/or 258 and/or database 215 of FIG. 2).

In operation 500, a processor may store in a memory a training dataset for training a machine learning model.

In operations 510-530, a processor may select a plurality of anchor points that represents a subset of columns and/or rows of an initial kernel K of the training dataset, without generating the initial kernel K. For a Gaussian kernel K, the number of selected anchor points may be set based on a lower bound for the lower rank determined to be associated with a desired condition number of the preconditioned KRR system. The lower bound is determined directly from the training dataset stored in operation 500, without generating or analyzing the initial kernel K.

In operation 510, the processor may generate a randomized decomposition of the initial kernel K by projecting the initial kernel K onto a random matrix in a lower dimensional space. In some embodiments, the processor may accelerate the randomized decomposition using sparse projections onto a sparse random matrix.

In operation 520, the processor may permute the randomized decomposition (e.g., RID) to reorder the columns and/or rows to approximate the initial kernel K. The processor may permute the columns and/or rows of the randomized decomposition e.g., by Rank Revealing QR (RRQR) or Rank Revealing LU decompositions.

In operation 530, the processor may select anchor points representing a subset of columns and/or rows based on their permuted order, e.g., selecting the anchor points representing the top ordered subset of columns and/or rows.

In operation 540, the processor may generate a reduced-rank kernel $\tilde{K}$ comprising the subset of columns and/or rows represented by the selected anchor points. The reduced-rank kernel $\tilde{K}$ approximates the initial kernel K with a relatively lower rank than the initial kernel K. The reduced-rank kernel $\tilde{K}$ may approximate the initial kernel K sufficiently closely by using randomized interpolative decomposition and bounding the difference $\|\tilde{K}-K\|$.

In operation 550, the processor may precondition a KRR system using a preconditioner generated based on the reduced-rank kernel $\tilde{K}$. In some embodiments, preconditioning comprises applying the preconditioner $P \triangleq (\tilde{K}+\beta I)^{-1}$ to the KRR system $(K+\beta I)\alpha = b$. The reduced-rank kernel $\tilde{K}$ and/or preconditioner may be generated and/or applied e.g., by CUR decomposition or Nyström approximation. The preconditioner may be generated to preserve the structure of the initial kernel K to enable fast matrix multiplication by the preconditioner.

In operation 560, the processor may solve the preconditioned KRR system to train the machine learning model. The solution process may be executed by an iterative method, such as, the conjugate gradient technique. The processor may determine an upper bound to a condition number of the preconditioned KRR system to set an upper bound or fixed number of iterations for solving the preconditioned KRR system associated with a desired level of accuracy.

In operation 570, the processor may operate the trained machine learning model in a prediction mode to predict a new output for a new input. Outputs of the machine learning model may include controls for autonomous vehicle driving, electric field simulation models, weather forecasting, natural language recognition, and other artificial intelligence.

Embodiments of the invention provide a fast and accurate KRR algorithm with a preconditioner for the matrix kernel constructed using randomized interpolative decomposition (e.g., RRQR or RRLU) and matrix decompositions (e.g., CUR or Nyström). Experimental results show this technique is significantly faster than conventional KRR methods (see e.g., FIGS. 3A-4D). Some embodiments further provide significantly reduced memory consumption compared to conventional KRR methods, e.g., because there is no need to store a full n×n kernel matrix K. Only the factor/decomposition matrices (e.g., C and U of the CUR decomposition and Nyström approximation) of the reduced rank kernel matrix $\tilde{K}$ are stored, which are smaller than, and occupy significantly less memory space than, the full kernel K. Embodiments of the invention further provide an efficient application of the kernel matrix and reduces its condition number. Results show fast convergence of the KRR algorithm while maintaining accuracy, outperforming conventional methods. Embodiments of the invention also provide analysis and bounds for low-rank approximations used to determine the desired condition number.

When used herein matrices may be indicated by capital letters and vectors and scalars may be indicated by small letters. The norm $\|\cdot\|$ when applied to vectors may refer to the standard Euclidean norm, e.g., $$\|v\| = \sqrt{\sum_{i=1}^{n} v_i^2}$$

and to the spectral norm when applied to matrices, e.g., $$\|A\| = \sup \frac{\|Av\|}{\|v\|},$$

or to other measures of difference or distance. The norm $\|\cdot\|_A$ applied to a vector with respect to a positive semidefinite matrix A may be defined by e.g., $\|v\|_A = \sqrt{\langle v, Av \rangle}$. Singular values may be indicated in descending order, e.g., by $\sigma_1, \ldots, \sigma_n$ and eigenvalues by $\lambda_1, \ldots, \lambda_n$ also in descending order when they are real. $A \geq 0$ on a square matrix may indicate that A is positive semidefinite and $A \geq B$ may indicate that $A - B \geq 0$. Other notations may also be used or indicated herein.

Although some embodiments of the invention are described in matrix form, the operations may be performed in non-matrix form, e.g., as sequences or other data structures.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 218 and/or 258 of FIG. 2), a disk drive, or a USB flash memory, encoding, including or storing instructions, e.g., computer-executable instructions, which, when executed by a processor or controller (e.g., processors 216 and/or 256 of FIG. 2), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for training a machine learning model using Kernel Ridge Regression (KRR), the method comprising:
   selecting a plurality of anchor points that represents a subset of columns and/or rows of an initial kernel of a training dataset, without generating the initial kernel, wherein the anchor points are selected by:

generating a randomized decomposition of the initial kernel by projecting the initial kernel onto a random matrix in a lower dimensional space;

permuting the randomized decomposition to reorder the columns and/or rows to approximate the initial kernel; and selecting anchor points representing a subset of columns and/or rows based on their permuted order;

generating a reduced-rank kernel comprising the subset of columns and/or rows represented by the selected anchor points, wherein the reduced-rank kernel approximates the initial kernel with a relatively lower rank than the initial kernel;

preconditioning a KRR system using a preconditioner generated based on the reduced-rank kernel; and solving the preconditioned KRR system to train the machine learning model.

2. The method of claim 1 comprising determining an upper bound to a condition number of the preconditioned KRR system to set a number of iterations for solving the preconditioned KRR system associated with a desired level of accuracy.

3. The method of claim 1 comprising, for a Gaussian initial kernel, determining a lower bound for the lower rank defining a number of the anchor points to select to reach a desired condition number of the preconditioned KRR system.

4. The method of claim 3, wherein the lower bound is determined directly from the training dataset, without generating or analyzing the initial kernel.

5. The method of claim 1, wherein the randomized decomposition is a random interpolative decomposition.

6. The method of claim 1, wherein the reduced-rank kernel approximates the initial kernel sufficiently closely by using randomized interpolative decomposition and bounding the difference between the initial kernel and reduced rank kernel.

7. The method of claim 1 comprising accelerating the randomized decomposition using sparse projections onto a sparse random matrix.

8. The method of claim 1 comprising permuting the columns and/or rows of the randomized decomposition by Rank Revealing QR (RRQR), and selecting the anchor points representing the top ordered subset of columns and/or rows.

9. The method of claim 1, wherein preconditioning comprises applying the preconditioner to the KRR system using a CUR decomposition or Nyström approximation of the subset of the columns and rows.

10. The method of claim 1, wherein the preconditioner preserves the structure of the initial kernel to enable fast matrix multiplication by the preconditioner.

11. The method of claim 10, wherein the fast matrix multiplication is a Fast Gauss Transform, Fast Improved Gauss (FIG) transform, or Fast Multipole technique.

12. The method of claim 11, wherein, for a Gaussian initial kernel, the FIG transform is used.

13. The method of claim 1, wherein the KRR system is solved by the conjugate gradient technique.

14. The method of claim 1 comprising operating the trained machine learning model in a prediction mode to predict a new output for a new input.

15. A system for training a machine learning model using Kernel Ridge Regression (KRR), the system comprising:

one or more memory unit(s) configured to store a training dataset for training the machine learning model; and one or more processor(s) configured to:

select a plurality of anchor points that represents a subset of columns and/or rows of an initial kernel of the training dataset, without generating the initial kernel, wherein the anchor points are selected by:

generating a randomized decomposition of the initial kernel by projecting the initial kernel onto a random matrix in a lower dimensional space, permuting the randomized decomposition to reorder the columns and/or rows to approximate the initial kernel, and selecting anchor points representing a subset of columns and/or rows based on their permuted order, generate a reduced-rank kernel comprising the subset of columns and/or rows represented by the selected anchor points, wherein the reduced-rank kernel approximates the initial kernel with a relatively lower rank than the initial kernel;

precondition a KRR system using a preconditioner generated based on the reduced-rank kernel, and solve the preconditioned KRR system to train the machine learning model.

16. The system of claim 15, wherein the one or more processor(s) are further configured to determine an upper bound to a condition number of the preconditioned KRR system to set a number of iterations for solving the preconditioned KRR system associated with a desired level of accuracy.

17. The system of claim 15, wherein the one or more processor(s) are further configured to, for a Gaussian initial kernel, determine a lower bound for the lower rank defining a number of the anchor points to select to reach a desired condition number of the preconditioned KRR system.

18. The system of claim 17, wherein the one or more processor(s) are configured to determine the lower bound directly from the training dataset, without generating or analyzing the initial kernel.

19. The system of claim 15, wherein the one or more processor(s) are configured to train the machine learning model using KRR without storing the initial kernel in any memory unit in the system.

20. The system of claim 15, wherein the one or more processor(s) are configured to operate the trained machine learning model in a prediction mode to predict a new output for a new input.

* * * * *